United States Patent [19]

Kohn et al.

[11] 4,161,679
[45] Jul. 17, 1979

[54] CAM PROGRAM CONTROLLER SYSTEMS

[75] Inventors: Mitchell I. Kohn, Skokie; Ahdor H. Alton, Lake Zurich, both of Ill.

[73] Assignee: Love Controls Corporation, Chicago, Ill.

[21] Appl. No.: 669,815

[22] Filed: Mar. 24, 1976

[51] Int. Cl.² ............................................. G05B 19/40
[52] U.S. Cl. .................................... 318/685; 318/696; 200/38 B; 200/38 C; 200/153 LB; 33/18 R; 338/89; 338/116
[58] Field of Search ............... 318/685, 696, 138, 254; 200/38 B, 38 C, 153 LB; 338/89, 116; 33/18 R, 1 PT, 1 SP, 1 MP

[56] References Cited

U.S. PATENT DOCUMENTS

| | | | |
|---|---|---|---|
| 2,627,593 | 2/1953 | Tietig | 338/116 |
| 3,438,271 | 4/1969 | Cain | 74/569 |
| 3,555,381 | 1/1971 | Rappaport | 318/138 |
| 3,886,418 | 5/1975 | Austin et al. | 318/696 |

FOREIGN PATENT DOCUMENTS

| | | | |
|---|---|---|---|
| 1057064 | 2/1967 | United Kingdom | 200/153 LB |
| 1149151 | 4/1969 | United Kingdom | 318/138 |
| 1163945 | 9/1969 | United Kingdom | 318/138 |

*Primary Examiner*—B. Dobeck
*Assistant Examiner*—Eugene S. Indyk
*Attorney, Agent, or Firm*—Alter and Weiss

[57] ABSTRACT

A cam program controlled system providing a continuous set point signal representing a time function relationship using an impulse or stepping drive motor. The drive motor impulses are electronically derived; and therefore, the system's time base or speed can be readily varied using switches and/or jumpers, instead of requiring gear train or motor changes. Also, the drive motor is coupled to the cam program through only a pinion and an anti-backlash drive gear. The cam follower arm is biased against the cam with a constant force. Controls are provided so that a cam scriber built into the cam follower and a controller which is normally provided in the system enables the system to be used for preparing new cams.

36 Claims, 11 Drawing Figures

CAM PROGRAM CONTROLLER SYSTEMS

This invention relates to programmed controllers; and more particularly, to cam program controller systems for providing controlled outputs as functions of time in accordance with required process programs.

In controlling different processes, it is often necessary to provide different control characteristics as a function of time. For example, in heat treating metals, it may be necessary to bring the metal up to a certain temperature for a certain specified time period; lowering the temperature within a certain time period; maintaining the lowered temperature for a desired time period; and perhaps raising the temperature again to a third temperature within yet another time period; maintaining that third temperature for a given time period; and finally, bringing the temperature back to normal within a specified period of time.

In the past temperature controlled programs have often been provided by cam program controllers. The cams of the prior art cam program controller programs were driven through gear trains by synchronous motors. The cam followers were coupled to potentiometers so that movement of the cam followers varied the resistance of the potentiometer and thereby provided signals to vary the "set" temperature in controllers. However, the coupling between the motor and the cam and between the follower and the potentiometer were usually subject to backlash difficulties. Time indications for utilization in performing time based functions were obtained by positioning micro-switches for operation by the cam. Varying the timing of operation of the microswitches was, therefore, necessarily complicated and time consuming. Also, the gear train synchronous motor driven prior art cam controller systems were not reliable since the systems would not remain at the desired setting.

Many types of controllers can be used with cam programs. For example, see U.S. Pat. No. 3,819,960 entitled CONTROLLER CIRCUIT, issued on June 25, 1974, and assigned to the assignee of this invention, which can be readily used with the cam programmer system described herein.

In the past in order to vary the time base of a cam programmed controller, it was necessary to either change the cam or change the gearing between the synchronous motor and the cam. Similarly, if the cam program controller was for use in a country or place where the base frequency was not 60 Hertz, a different gear drive or a different synchronous motor was necessary to provide the same time function with the same cam.

Further, in the past, the gearing necessary between the synchronous drive motors and the cams have necessarily been relatively complicated and extensive to enable obtaining useful rotational speed of the cams. Further, it has always been necessary to be able to vary the time base for making the controller as versatile as possible. The relatively complicated gear train led to errors in the "set" signal, because of backlash in the many gears, so that the program could not be readily repeated with the necessary reliability.

The cam follower arm should be held juxtaposed to the contour of the cam during the entire movement of the cam. The periphery of the cam often takes complicated geometric shapes. In the past, the cam follower many times would not run juxtaposed to the contour of the cam throughout the cam's motion. This, of course, causes error in the "set" signal generated by the cam program controller systems.

In the past, in order to provide cams for a cam programmer, many complicated measurements during a time sequence were necessary to get the data required. This data then was translated to rotary data and scribed onto a cam. The cam was then cut so that the contour of the cam operating at a given number of revolutions per minute provided the desired time function. The many measurements required and the subsequent transfer of these measurements often led to operator error.

The above mentioned drawbacks made the costly cam program controller unreliable and unsatisfactory.

Accordingly, an object of the present invention is to provide cam program controller systems using stepping motors, instead of synchronous motors.

A further related object of the present invention is to provide cam program controller systems wherein program times can be selected by means of electrical selection devices, such as jumpers and/or switches, varying electrical components without the necessity of changing any gears. In fact, the entire program control has only one gear set—the motor pinion and the main drive anti-backlash gear set.

Yet another object of the present invention is to provide cam program controller systems wherein the cam scriber is built into the cam follower so that the cam contour can be marked right on the unit on which the cam will be utilized.

Another related object of the present invention is to provide unique switch systems in the cam program controller systems which enable the processed temperature indicator on an associated controller to be used as a program position indicator to facilitate laying out a program right on the cam program controller of the system.

Yet another object of the present invention is to provide cam program controller systems wherein the program time cycles are completely selectable and variable. In a preferred embodiment the following cycles and variations in the cycles are provided—from 1 min. to 255 min., in 1 min. increments; 1 hr. to 255 hrs., in 1 hr. increments; and 6 hrs. to 1,530 hrs. in 6 hr. increments. The cycles and time variations in the cycles can be altered by varying resistors and/or capacitors for obtaining combinations of cycles and time variations therein as desired.

Yet another object of the present invention is to provide cam program controller systems which can be used to provide a "set" signal from a cam controlled programmer that repeats automatically or that stops at the end of the program.

In addition, a further object of the present invention is to provide cam programmer systems wherein, regardless of the program time selected, the cam can be automatically rotated at an accelerated speed. In this relation the program may be advanced or reversed at any time by pressing a push button switch either to advance or reverse it at an accelerated speed or alternatively to "jog" the cam in single steps. The system also provides means for automatically changing the speed of the angular rotation or program time during a program.

Yet another object of the present invention is to provide cam program controller systems wherein the cam follower is held pressed against the contour of the cam with a constant force, almost regardless of the shape of the cam, or the speed or the direction at which the cam is revolving.

Still another object of the present invention is to provide cam program controller systems that are "fail safe".

Yet another object of the present invention is to provide cam program controller systems wherein output functions can be easily controlled to occur at any desired time within the program, or at any desired set point output.

Still another object of the present invention is to provide cam program controller systems that provide adjustable start and end of program functions, and further that selectively automatically repeat the program.

Yet another object of the present invention is to provide cam controlled programmer systems wherein time indicating outputs are constantly provided.

Still another object of the present invention is to provide cam controlled programmer systems wherein backlash between the cam follower and the cam operated potentiometer is minimized.

The above-enumerated and further objects and features of the invention will be best understood by making reference to the accompanying drawings; wherein.

Figure 1:
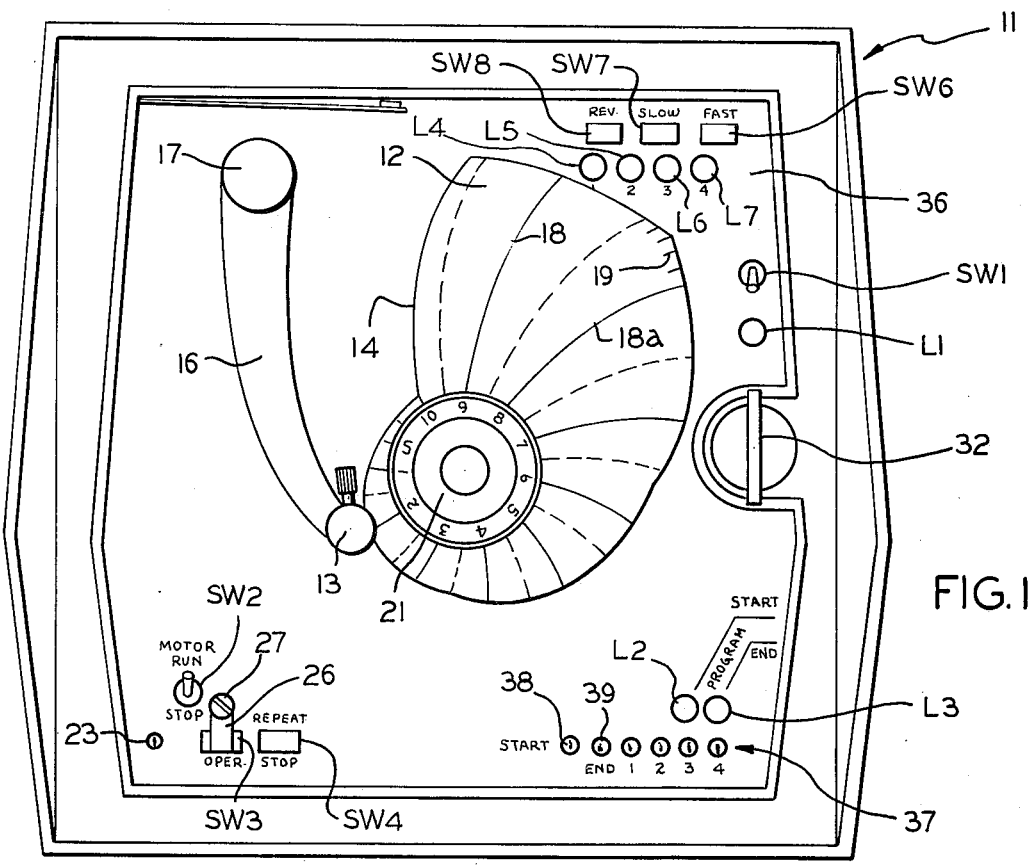
FIG. 1 is a front view of the cam program controller panel for use in the cam program controller systems showing particularly the cam, cam follower and certain controls.

The cam program controller panel of FIG. 1 is shown at 11. It comprises a cam 12 cut specifically to provide a desired program; that is, the cam has a contour that causes a temperature "set" signal at a given time. The cam follower 13 is held juxtaposed to the contour of the cam 14. Movement of cam 12 causes the cam follower 13 to move; consequently, arm 16 moves, turning a potentiometer coupled to the cam follower arm through hub 17.

The program cam is scribed at equal angular positions to show major time lines, such as time lines 18, 18a, and minor time lines, such as time line 19, extending between the major time lines 18 and 18a. A cam "hold-down" knob 21 is provided for securing the cam to the cam drive shaft. The cam is keyed, not shown, to preclude cam slippage or placement errors. Preferably, the cam is divided either on a decimal basis; i.e. graduated from 0 to 10; or on a clock drive basis; i.e. graduated from 0 to 24. The "0" line is shown as "S" for start.

Various controls are also shown on the cam program controller panel of FIG. 1. For example, the entire operation begins when the main power switch SW1 is operated to the "on" position and the motor "run-stop" switch SW2 is turned to the "run" position. A cam follower "fine adjust" control potentiometer wiper is shown at 23. It, as will be described later, operates a vernier potentiometer P5 which assures that the signal provided by a cam follower potentiometer P4 is properly adjusted to give the set signal desired.

One of the features of the cam program controller system is that the system can be used to "cut" a cam. A cam "set-up" or "operate" switch SW3 is provided. It determines whether the system is being used to provide a means to enable the marking of a cam blank or whether the system is being used to provide the programmed "set point" signal.

When switch SW3 is in the "operate" position, then the system provides the programmed "set point" signal. A lock-out pawl 26 inhibits the accidental operation of the switch SW3. The lock-out pawl is removed by unscrewing threaded fastener, such as screw 27, and turning the pawl away from its protective position so that the switch SW3 can be operated to its "set-up" position from its "operate" position.

A switch SW4 is provided on the front panel 11 for selectively determining whether the cam rotation will stop at the end of the cam program or whether the system will automatically repeat the rotation of the cam. When switch SW4 is operated, then the cam stops revolving at the end of the program.

Indicator lamps are provided. In a preferred embodiment these lamps are light emitting diodes. When the power is "on", indicator lamp L1 is lit. Other indicator lamps are "start program" light emitting diode L2 and "end-of-program" light emitting diode L3.

An added feature of the system is that outputs for different functions are obtainable from the system. The operation of the output functions are indicated by the four indicator lamps shown as L4–L7, respectively. The operation of the output function circuitry are each controlled by the output function switch "set point" adjustment potentiometers shown generally as 37. Other fine adjust or vernier adjust controls are the "program start fine adjust" 38 and the "program end fine adjust" 39.

Means are provided for fast advancing the cam when desired. More particularly, switch SW6 is used to "fast advance" the cam. The program cam can also be "jogged" using the program cam "slow" switch SW7. The "jogging" control is especially useful when using the programmer system to prepare a new program cam. The program can also be reversed using the program cam "reverse" switch SW8. The reversal is also effective during the operation of the "jog" or "fast" switches SW6, SW7, respectively. The panel 11 includes a transparent hinged cover 36 for protection of the cam and components. The cover is shown locked closed by latch 32.

Figure 2:
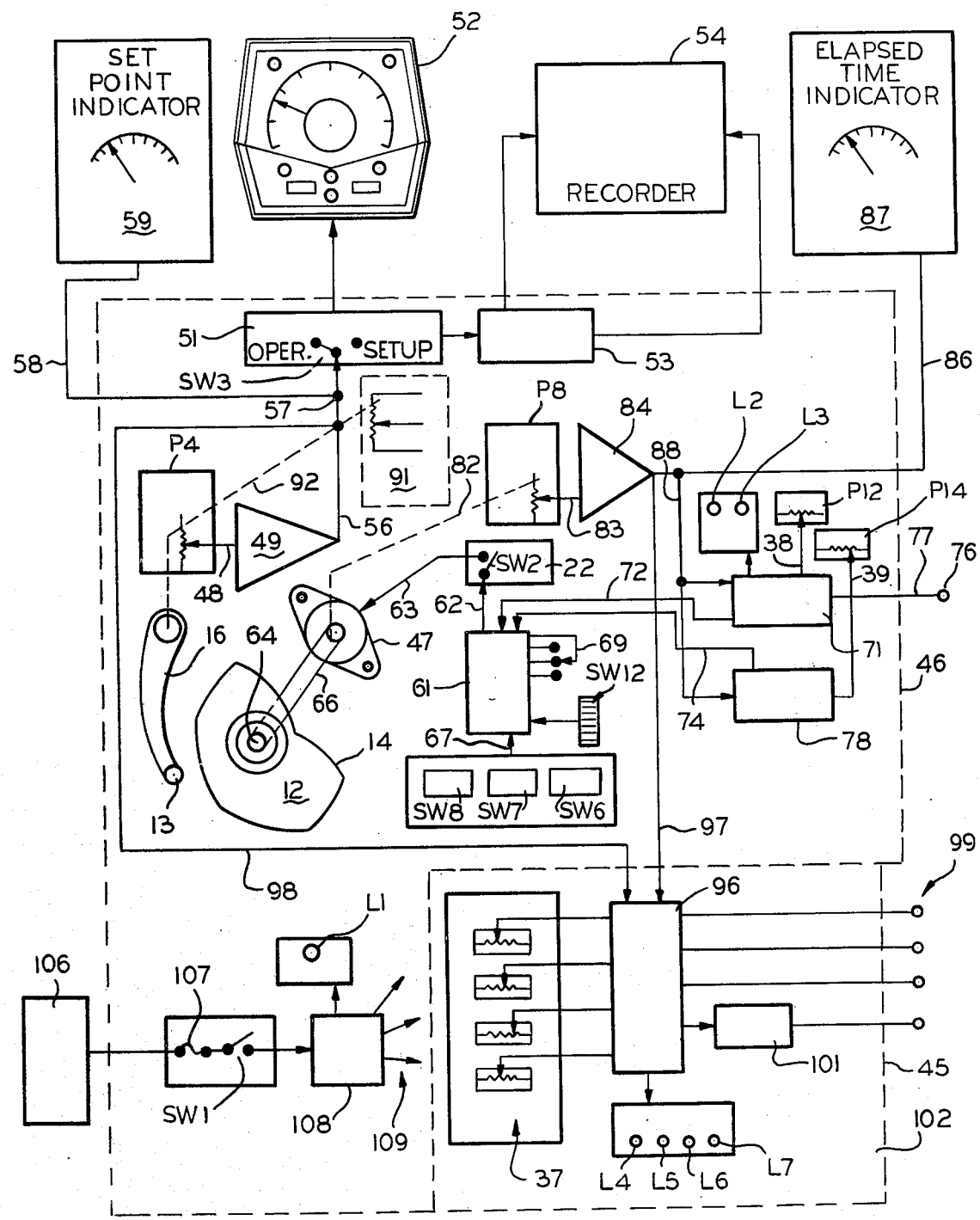
FIG. 2 is a block functional diagram showing of the cam program controller system including the cam, its drive motor, the cam follower and control circuits.

The operation of the cam program controller systems is generally shown in the block functional diagram of FIG. 2. The basic elements of the cam program controller system are shown enclosed by the dashed lines 46. The ancillary function circuitry is shown enclosed by the dashed lines 45.

Included in the cam program controller system is the cam 12 having a specific contour 14. The cam follower and scriber 13 and the cam follower arm 16 cooperate with the cam to implement the program as defined by the cam. As the cam rotates when driven by drive motor 47, the cam follower arm moves to vary the wiper 48 of the cam follower potentiometer P4, and therefore, changes the input to the function or temperature amplifier 49.

The output 56 of the amplifier 49 is connected to the cam "set-up" or "operate" switch SW3. When switch SW3 is in the "operate" position, the output of the amplifier 49, which represents the "set" signal is conveyed through a "set-up" signal interface circuit 51, which includes switch SW3, and is then delivered to a controller shown as 52. The controller uses the "set" signal to drive the furnace, for example, to a temperature matching the "set signal" in a manner such as described in the previously mentioned U.S. Pat. No. 3,819,960. The interface circuitry 51 may also connect the controller 52 to a recorder drive circuit 53 operating a recorder 54 when a constant record of the actual function, such as the temperature is desired.

In the "set-up" position of switch SW3, the equipment is used to scribe a cam blank for cutting the cam to provide a program; then the controller is used to indicate the temperature represented by a position of the cam follower at a particular rotational position of the cam blank to enable scribing a cam blank at the temperature point desired.

The output of the amplifier 49 may be tapped to point 57, for example, and connected through conductor 58 to a "set point" indicator 59. This is useful, for example, where different types of controllers are used which would not be convenient for indicating the "set point" function required for scribing the cam blank. The "set point" can be a temperature, a pressure, a force, or any time related function required in a process.

Non-synchronous motor means are provided for driving the cam. For example, the non-synchronous motor 47 is an impulse or stepping motor actuated by signals initiated at the motor impulse and drive circuits 61. The output of the impulse circuit 61 is directed through conductor 62 to the motor "run-stop" switch SW2 and through conductor 63 to the motor 47 to "step" the motor. In a preferred embodiment the motor moves 7.5° per impulse received. The use of the stepping motor instead of a synchronous motor makes the system independent of line frequency and minimizes the system's dependence on line voltage or regulation. The motor 47 is coupled to cam 12 through anti-backlash means, shown schematically as coupling means 66.

The motor control switches SW6, SW7 and SW8 are shown schematically connected to the motor impulse and drive circuits by conductor 67. These switches control the fast stepping, slow stepping and direction of rotation of the motor, respectively. Means are further provided for selecting the length of the program cycle and the cycle increments. The jumper 69 coupled to circuit 61 selects the increments; i.e. minutes, hours or six hour periods and the switches shown generally as SW12 determine the number of increments in the cycle; i.e. up to 255 minutes, up to 255 hours, and up to 1530 hours.

Means are provided for varying the program provided by the cam. For example, there is the circuit 78 which is coupled to the wiper 39 of the "end-of-program" fine adjust potentiometer P14. In addition, a "start" and "end-of-program" control circuit 71 is provided which commands the motor impulse and drive circuit 61 to start or to stop the motor by directing signals to circuit 61 over conductor 72. Circuit 71 is also connected to the wiper 38 of the "start" fine control potentiometer P12.

The output of the "start" and "end-of-program" circuit 71 is coupled to the "start" and "end" indicators L2 and L3, respectively. The "stop" or "repeat" circuit 78 is connected to the timing circuit 61 through conductor 74. Remote "start" terminals, such as remote "start" terminal 76 is connected to the "start" and "end-of-program" drive circuit 71 through conductor 77.

Means are provided for determining the elapsed time of the program. More particularly, the motor 47 is coupled to control a timing potentiometer P8 as indicated by dashed line 82. The wiper 83 of the potentiometer P8 is coupled to timing amplifier 84. The output of the operational amplifier 84 is coupled through conductor 86 to an elapsed time indicator 87. In addition, the output of the timing amplifier is also coupled to circuits 71 and 78 through conductor 88.

The elapsed time meter provides a continuous time indication which shows the amount of time left on the program or the amount of elapsed time in which the program has been running.

Optional features are easily provided. For example, an optional cam follower potentiometer is shown at 91 mechanically coupled to the cam follower arm as indicated by dashed lines 92.

A function relay circuit 45 comprising a plurality of relays and associated circuitry shown as 96 can also be provided. Signals for operating the relays are shown as being from timing amplifier 84 over conductor 97 or from temperature amplifier 49 over conductor 98. The output of function relay card or circuit 96 is available to provide various control functions by connecting to output terminals, such as are shown collectively as output terminals 99. In addition, separate output contacts can be provided as indicated at 101.

The function indicator lamps, previously discussed and shown as light emitting diodes L4–L7, are shown connected to the output of the function relay card 96. Similarly, the relay set point adjustments which are the output function switch adjustments are shown collectively as 37. These are potentiometers used to fine adjust the operating point of switching devices, such as relays on the function relay card 96.

The function relay card and its associated control devices are an option as indicated by the separate dashed line 102. However, an integral part of the main card 46 is the power circuit shown as having an alternating current power source input 106 which is connected through a fuse 107 to the power switch SW1 and from there to the direct current power supply indicated as 108. A power on indicator L1 is shown on the card 46. As indicated at arrows 109, the power supply circuitry is coupled to the various functional blocks requiring direct current power.

A more detailed explanation of the operation of the electronic circuitry used with the cam program controller system will be given in conjunction with FIGS. 3–6. The explanation will utilize the number designation of circuit components already used within FIGS. 1 and 2, wherever possible.

Figure 3:
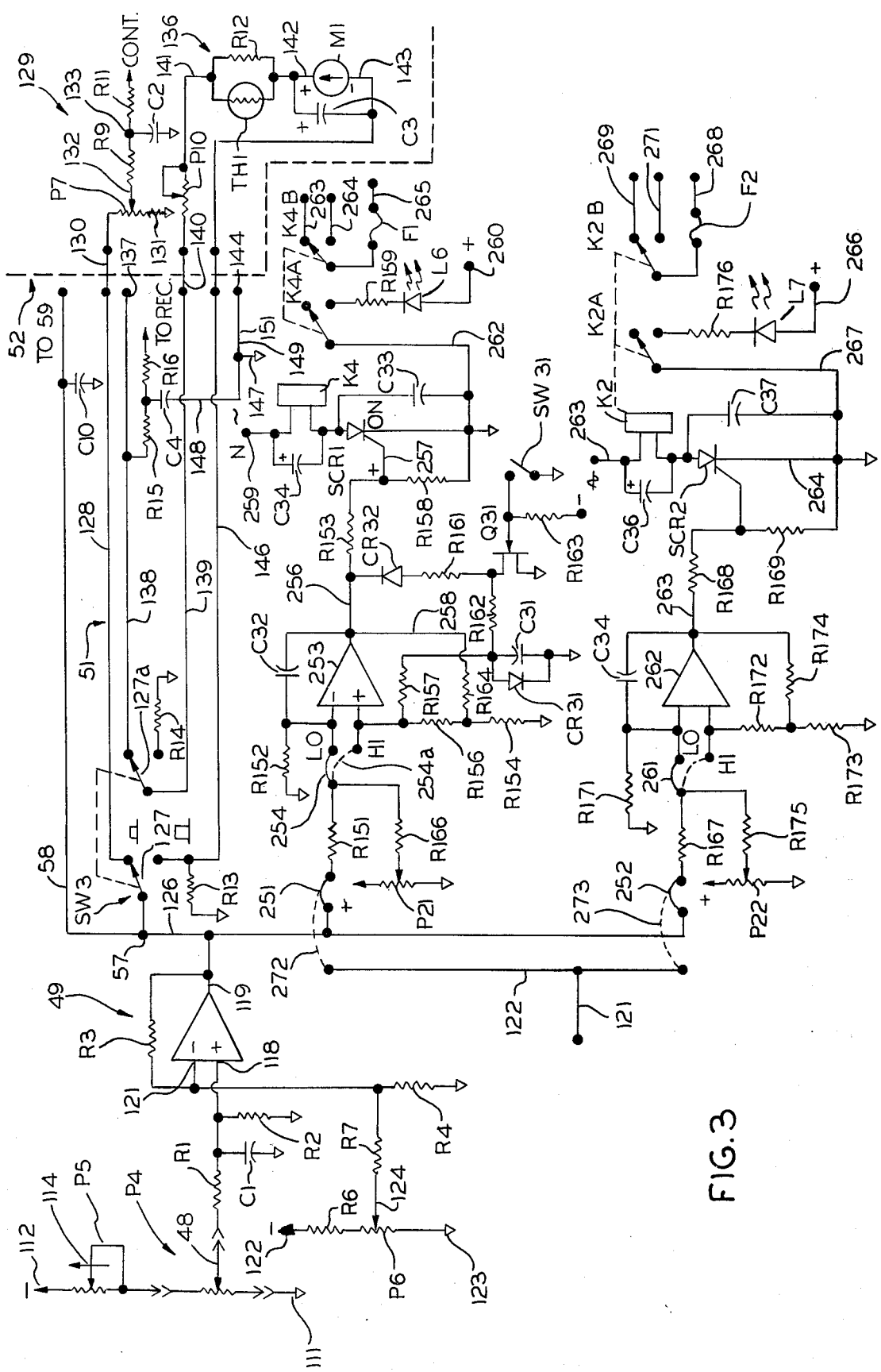
FIGS. 3–6 are schematic diagrams showing electronic circuitry indicated in the block functional diagram of FIG. 2.

Turning to FIG. 3, therein is shown means for providing a signal that varies as a function of the cam contour; more particularly, the cam follower controlled potentiometer, hereinbefore cited in FIG. 2 as potentiometer P4.

The temperature potentiometer P4 is shown with the resistor element being connected between ground at 111 and negative battery at 112. Means are provided for controlling the span of the function scale—in this case, the temperature scale as determined by the temperature potentiometer. More particularly, an auxiliary potentiometer P5 is connected between potentiometer P4 and negative battery at 112. The auxiliary potentiometer's wiper 114 is tied to conductor 116 used in coupling potentiometer P5 to potentiometer P4. Thus, the entire resistance of the potentiometer P5 can be taken out of the circuit if desired. This, of course, provides more voltage per turn of the potentiometer P4.

The wiper 48 of potentiometer P4 is connected into the non-inverting input 118 of amplifier 49 through series coupling resistor R1. Fail safe means, such as resistor R2 which is connected between the positive input 118 and ground are provided to prevent the operational amplifier 49 from providing an incorrect signal. For example, if the winding of potentiometer P4 were to open, resistor R2 causes the "set point" signal to be the lowest controller temperature, instead of a random high temperature. A filter capacitor C1 bridges resistor R2 and forms an integrating circuit to cancel the noise caused by the wire wound resistor R2.

Means are provided for feeding back the output of amplifier 49 to the negative input thereof. More particularly, the output 119 of amplifier 49 is coupled to the negative or inverting input 121 through resistor R3. Resistor R3 acts in conjunction with resistor R4 as a voltage divider circuit. The other end of resistor R4 is connected to ground.

A bias voltage is provided by biasing circuit made up of resistor R6 and potentiometer P6 connected between negative voltage at 122 and ground at 123. The wiper 23 of potentiometer P6 is coupled through resistor R7 to the junction point of resistor R4 and input 121 of amplifier 49. The potentiometer P6 enables fine adjusting the operating point of amplifier 49.

The output 119 of amplifier 49 is coupled through conductor 126 to the armature 127 of the push button, double pole, double throw "operate, set-up" switch SW3. When switch SW3 is in the "operate" position; i.e. after its being pressed, it connects the output 119 of amplifier 49 through conductor 126 to a first armature 127 of switch SW3. The operated switch SW3 couples the output 119 through conductor 128 through terminal 130 to controller coupling circuit 129. The controller coupling circuit comprises potentiometer P7 having its wiper coupled through series resistors R9 and R11 to the actual controller. A filter capacitor C2 is coupled at 133 from the junction of resistors R9 and R11 to ground. The resistance element of potentiometer P7 is coupled from the terminal 130 to ground at 131.

Thus, the "set point" signal is transmitted to the controller through interface circuit 51. The potentiometer coupling circuitry may be located within the controller. A signal is received back from the controller indicating the function condition, in this case, the temperature. It is received at terminals 137 and is transmitted through conductor 138, armature 127a of switch SW3, conductor 139, terminal 140 to meter circuit 136 of the controller. The meter circuit 136 extends through a potentiometer P10, conductor 141, a parallel circuit comprising resistance R12 bridged by thermistor TH1, to the positive end of the meter M1 through conductor 143, terminal 144, conductor 146 and resistor R13 to ground. The meter movement is bridged by capacitor C3 designed to filter out transients or spikes in the circuitry and to prevent the meter pointer from bouncing in high vibration areas. Therefore, in the "operate" position, the "set point" output voltage of the amplifier is transmitted to the controller and the actual temperature monitored by the controller is read on the meter.

When switch SW3 is unoperated; i.e., in the "set-up" position, the armature 127 couples the output of amplifier 49 to conductor 146. The output of amplifier 49 is negative and is coupled to meter circuit 136 through terminal 144 and into the negative end of the meter M1 through conductor 143. The positive end of the meter M1 is connected through conductor 142, the parallel circuit coupling resistor R12 bridged by thermistor TH1, conductor 141, potentiometer P10, terminal 140, conductor 139, armature 127a of switch SW3 and through resistor R14 to ground. A resistor R13 is connected from conductor 146 to ground. Resistors R14 and R13 are of the same value and are used to provide the correct voltage to the meter movement. It should be noted that with the switch SW3 in the "set-up" position, resistor R13 has no practical effect. Also, the meter, at this time, is not reading the actual temperature, but instead is reading the "set point" temperature, as represented by the voltage output of the amplifier 49.

Means are provided for coupling a recorder, such as recorder 54 to the interface circuit 51. More particularly, the recorder is coupled to conductor 138 through series resistors R15 and R16. The junction of the series resistors R14 and R16 is coupled to ground at 147 through filter capacitor C4 and conductor 148. Ground is interconnected between the controller 52 and the interface circuitry by ground bus conductor 149 which leads to terminal 151.

Means are provided for coupling set point indication meter 59 to the output of amplifier 49. More particularly, the output 119 of amplifier 49 is coupled through conductors 126 and output 119 of amplifier 49 is coupled through conductors 126 and 58 to a terminal leading to meter 59. Conductor 58 is bridged to ground by filter capacitor C10.

Figure 4:
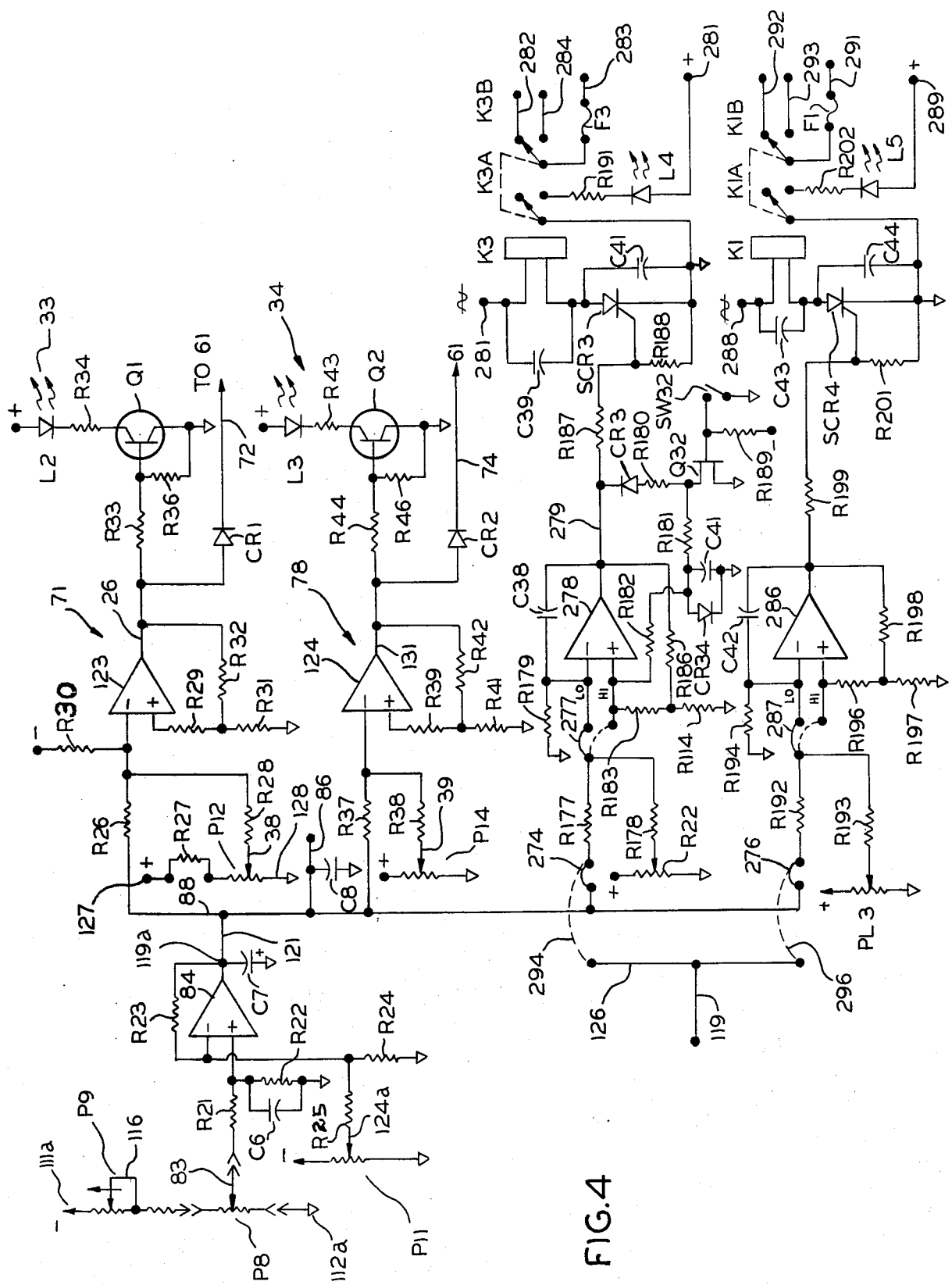

Turning to FIG. 4 therein is shown means for obtaining a constant indication of the program elapsed time. More particularly, therein is schematically shown the timing potentiometer P8 and timing amplifier 84, previously illustrated, in the functional block diagram of FIG. 2. The timing potentiometer P8 is shown as being attached from negative voltage at 111a to ground at 112a in series with an auxiliary potentiometer P9. The auxiliary potentiometer P9 is used to adjust the time span covered by the main timing potentiometer P8. The wiper 116 of the auxiliary timing potentiometer P9 is connected to short out any portion of the auxiliary potentiometer as desired. The wiper 83 of timing potentiometer P8 is mechanically coupled to the motor 47. The windings of the potentiometer P8 cover 335 degrees of the rotation of the motor. Thus, in each revolution of the wiper, it passes through an open portion of the potentiometer.

The wiper 83 is electrically coupled through a series coupling resistor R21 into the positive or non-inverting input of operational amplifier 84 connected as a buffer amplifier. In a preferred embodiment the output 119a of amplifier 84 ranges from 0-8 volts depending on the position of the wiper 83 of the potentiometer P8 when the input supply voltage at 111a is −6.32 volts.

Fail safe means are provided for preventing the operational amplifier from operating under "open" conditions. More particularly, resistor R22 is coupled between the junction of resistor R21 and the positive input of amplifier 84 and ground. A filter capacitor C6 bridges resistor R22. The output at 119a is fed back to the negative, or inverting, input of amplifier 84 through resistor R23. The junction of resistor R23 and the negative, or inverting, input is coupled to ground through resistor R24. A bias or control voltage is fed to resistor R24 from potentiometer P11 having its resistance element connected between negative voltage and ground. The wiper 124a of potentiometer P11 is coupled to the junction of resistor R24 and the negative input of amplifier 84. A filter capacitor C7 is coupled from the output 118 of amplifier 84 to ground.

The time indication which is the negative output of amplifier 84 is coupled through conductor 121 and conductor 88 to operational amplifiers 123 and 124, both connected as comparators. The comparator 123 is the "start program" comparator of circuit 71. The comparator 124 is the "stop-at-end" or "repeat" program comparator of circuit 78. The signal received from comparator 123 is used to start the timing circuits 61. The signal received from comparator 124 is similarly used to stop the timing circuits 61 or cause them to automatically repeat the program.

Conductor 88 is connected to the negative input of comparator 123 through series coupling resistor R26. The value of the signal output of amplifier 84 is a function of the position of the wiper of the timing potentiometer; and therefore, a function of the angular position of the motor 47 and cam 12. At the "start" position the wiper 83 of potentiometer P8 is positioned so that the output of amplifier 84 is approximately zero.

Amplifier 123 is biased so that when there is no output from amplifier 84, comparator 123 provides a positive output at 126. Biasing is provided by the biasing circuits, including the positive biasing circuit which consists of the potentiometer P12 connected between positive voltage at 127 and ground at 128. A fixed resistor R27 is in series with the positive voltage at 127 and the top of the resistance element of potentiometer P12 to restrict the range of the potentiometer. The wiper 38 of potentiometer P12 is connected to the negative input of operational amplifier 123 through a coupling resistor R28.

An additional negative bias is provided by a trim resistor R30 connected between negative voltage and the negative input of amplifier 123. The positive input of amplifier 123 is coupled to ground through series resistors R29 and R31. A feedback resistor R32 connects the output 126 of operational amplifier 123 to the coupling point of resistors R29 and R31.

It should be noted that potentiometer P12 is the "program start" fine adjust control shown on the panel arrangement of FIG. 1, as wiper 38, and in the functional block diagram of FIG. 2. It can adjust the bias on amplifier 123 so that the output of that amplifier goes positive at either the beginning point of potentiometer P8 which coincides with the timing line "S" of the cam, or at any point within the first 15% of the cam program.

When the output of amplifier 123 goes positive (start of the program), then a signal passes through diode CR1, conductor 72 to timing circuits 61. The positive signal also passes through coupling resistor R33 to the base of NPN transistor Q1, used to drive a light emitting diode L2 for indicating the start of the program. The light emitting diode L2 is coupled between positive voltage and the collector of transistor Q1 through resistor R34. The emitter of transistor Q1 is coupled to ground. The base of transistor Q1 is coupled to ground through resistor R36 acting in conjunction with resistor R33 as a voltage divider.

When transistor Q1, responsive to the positive signal at its base, turns on, a current passes through light emitting diode L2.

Comparator 124, with its associated circuitry, comprises block 78 of FIG. 2. The coupling between conductor 88 and operational amplifier 124 is affected through coupling resistor R37. The "end" fine adjust potentiometer P14 is used to control the point at which the output 131 of amplifier 124 goes positive from its normal negative output. This is accomplished by biasing the negative input of amplifier 124 using potentiometer P14 whose resistance element is connected between positive voltage and ground. The wiper 39 of potentiometer P14 is connected to the negative input of operational amplifier 124 through coupling resistor R38. The positive input of amplifier 124 is coupled to ground through the series resistors R39 and R41. The output of amplifier 124 is fed back to the positive input through feedback resistor R42 which is connected from output 131 to the junction point of resistors R39 and R41.

Means are provided for automatically stopping the cam program anywhere on the cam. More particularly, by moving the wiper 39, it is possible to automatically stop the motor and the cam at any time. The motor is stopped when the output of amplifier 124 changes from negative to positive. If the entire 335 degrees of the cam is being used in the program, then the potentiometer P14 is set so that amplifier 124 does not go positive until the output 119a reaches its maximum negative voltage; i.e. 8 volts in one preferred embodiment.

A positive signal at the output 131 passes through diode CR2 to conductor 74 leading to the motor timing circuits 61. That positive signal is selectively used to cause the cam to either repeat the program automatically or stop the program.

Means are provided for actuating and operating an "end-of-program" indicator. More particularly, NPN transistor Q2 is provided. The "end-of-program" indicator pilot light comprises light emitting diode L3 connected between positive voltage through resistor R43 to the collector of transistor Q2. The base of transistor Q2 is connected to the output 131 of amplifier 124 through coupling resistor R44. The junction point of the base of transistor Q2 and resistor R44 is connected to ground through resistor R46. Thus, resistors R44 and R46 act as a voltage divider circuit. The emitter of transistor Q2 is connected directly to ground. Thus, the light emitting diode L3 is actuated responsive to a positive signal on the base of transistor Q4 and consequently on conductor 74.

Conductor 86 is provided for connecting an elapsed time indicator, such as 87, shown in FIG. 2, if so desired. A filtering capacitor C8 couples conductor 86 to ground. Thus, "start" and "end-of-program" signals are provided by circuits 71 and 78 connected to the timing potentiometer P8 and the timing amplifier 84 through conductor 88. The "start" and "end-of-program" signals are carried by conductor 72 and 74 to the motor timing circuits 61.

Figure 5:
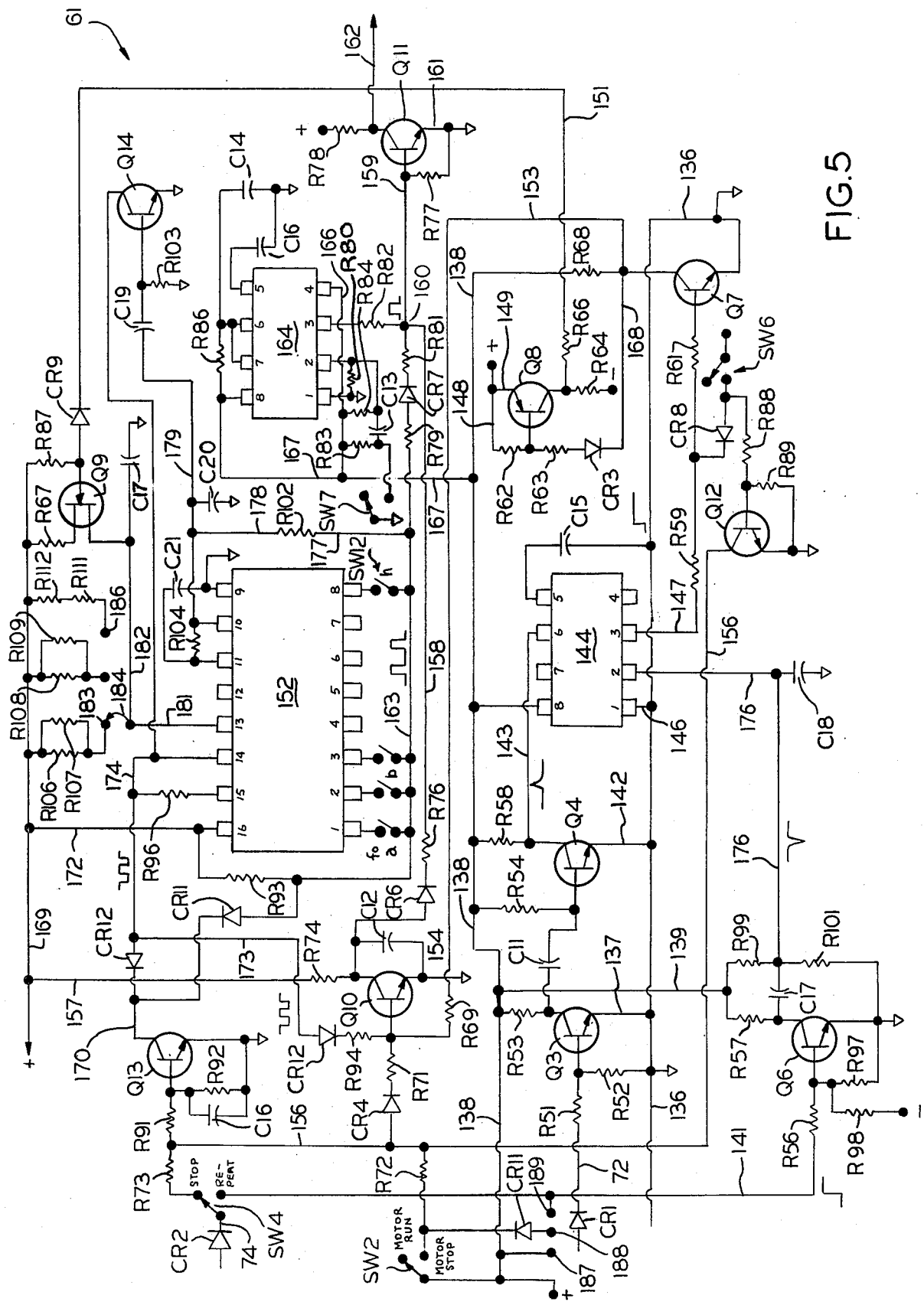

The motor timing circuits 61 and associated controls are shown in schematic fashion in FIG. 5. Diodes CR1 and CR2 are repeated in FIG. 5 for purposes of continuity of explanation. Diode CR2 is coupled into switch SW4 which is the "stop-at-end-of-program" or "repeat" switch on front panel drawing of FIG. 1.

The "start" signals from circuit 71 are used to start motor 47 stepping. The start signals are carried through diode CR1 and through conductor 72 to the base of an NPN transistor Q3 through series resistor R51.

The junction of resistor R51 and the base of transistor Q3 is connected to a ground bus 136 through resistor R52. Thus, the resistors R51 and R52 act as a voltage divider circuit.

The emitter of transistor Q3 is also connected to ground through conductor 137. The collector of transistor Q3 is connected to a differentiator circuit including capacitor C11. The other end of capacitor C11 is connected to the base of NPN transistor Q4. A load resistor R53 is connected from positive voltage over conductor 138 to the collector of transistor Q3.

When the switches SW4 and SW2 are in the positions shown, pulses received over conductor 72 cause the motor timing circuit 61 to initiate and continue the cam program. The differentiating circuit in addition to capacitor C11 includes the load resistor R53.

The NPN transistor Q4 amplifies the "spike" generated by the differentiating circuit. The "spike" is depicted immediately below conductor 143 coupled to the collector of transistor Q4. Bias resistor R54 is connected between the junction point of capacitor C11 and the base of transistor Q4 and conductor 138. The emitter of transistor Q4 is connected to ground through conductor 142. The junction of load resistor R58 and the collector of transistor Q4 are connected to the "reset" terminal 6 of integrated circuit 144 connected as a flip-flop circuit. The R-S flip-flop 144 is the well known commercially available 555 unit made by National Semiconductor Co., among others. Terminal 1 of the circuit 144 is connected directly to ground bus 136 through conductor 146. Terminals 5 and 2 of flip-flop 144 are by passed to ground through capacitors C15 and C18, respectively. Terminal 2 is the "set" terminal and terminal 3 provides the output signal which goes positive, or logic "1", responsive to the "set signal" on terminal 2 and is at ground or logic "0", responsive to a "reset" signal on terminal 6.

The "spike" signal on conductor 143 resets the flip-flop circuit 144 so that the output logic is "0", at terminal 3 and is conducted through conductor 147, resistors R59 and R61 in series to the base of NPN transistor Q7. The "0" voltage at the base of NPN transistor Q7 prevents that transistor from conducting.

Programmable time means are provided to supply basic drive signals for the impulse motor 47. More particularly, programmable time circuit 152 is provided, which may be a commercially available unit, such as the well known EXAR 2240, Intersil 8240 or equivalent.

The commercially available counter circuit 152 has 16 terminals thereon. The first eight terminals are connected to the outputs of an internal eight stage binary counter which provides pulsed outputs fed through through pull down open collector transistors. The binary counter receives signals from a time base oscillator through eight flip-flops which divide down the base frequency. Therefore, eight suboctaves of the fundamental are available simultaneously in the astable mode. In the monostable mode the collectors can be wired to give any combination of pulse width from 1 RC to 255 RC. In this application the circuitry is provided including transistor Q14 for controlling the pulse width independently of the RC factor; and in particular, is used to narrow the pulse width.

The terminal 9 is grounded, terminal 10 is normally the reset terminal, and terminal 11 is used as the trigger terminal. Terminal 12 is normally used as a modulation terminal, but in this application it is not used. Terminal 13 is the timing terminal, to which the RC networks are connected. Terminal 14 provides the time base output of the oscillator within the unit. Terminal 15 gives the regulator output and terminal 16 feeds into the voltage regulator.

The counter circuit 152 supplies a pulsed output onto conductor 163 whose frequency is variable as a function of the operation of switch SW12, and whose width is controlled by transistor Q14 and associated circuitry as explained more fully hereinafter. The base frequency, for example, is divisible by $2^n$ where n=0, 1, 2, 3, 4, 5, 7, and 8, by the operation of switches SW12a ... h, respectively.

The signal on conductor 163 is transmitted through resistor R79, diode CR7, resistor R81 and conductor 159 to the base of NPN transistor Q11. The output of transistor Q11 at its collector is coupled to the motor drive circuits through conductor 162.

A bias resistor R77 couples the base of transistor Q11 to ground. The emitter of transistor Q11 is connected directly to ground through conductor 161. Pulses are received at the base of transistor Q11 which operate transistor Q11 to cause drive pulses to appear on conductor 162. The pulses for the base of transistor Q11 appear at point 160 which is an "OR" gate point.

The appearance of pulses at point 160 is controlled, among other ways, by the output of NPN transistor Q10. Transistor Q10 has its base coupled to terminal 14 of circuit 152. Terminal 14 provides fast time base pulses which are transmitted to the base of transistor Q10 through diode CR13 and resistor R94.

The emitter of transistor Q10 is tied directly to ground through conductor 154. A positive drive voltage may also appear at the base of transistor Q10 through positive bus 138, and resistors R68 and R69 to normally keep transistor Q10 switched on. When transistor Q10 is switched "on" voltage at its collector is "0" notwithstanding standing the terminal 14 pulses. When transistor Q7 operates, then transistor Q10 is controlled by the terminal 14 pulses. When transistor Q7 is not operated, then the terminal 14 pulses do not control transistor Q10 so that fast pulses are not provided to point 160 controlled by terminal 14 through transistor Q10 and conductor 158.

A filter capacitor C12 by passes the collector to the emitter of transistor Q10 to suppress any transients which may appear. The collector of transistor Q10 is coupled to positive voltage through load resistor R74 and conductor 157.

When there are pulses from terminal 14 of circuit 152, then these pulses operate transistor Q10 so that the collector of transistor Q10 also has pulses which are transmitted through diode CR6 and resistor R76 to point 160.

Pulses are also received at point 160 from circuit 152 through switch SW12, resistor R79, diode CR7 and resistor R81. Single step jogging pulses may also be received at point 160 from terminal 3 of single shot multi-vibrator circuit 164 through resistor R82. Circuit 164 is also a commercially available 555 unit.

Means are provided to cause the motor to "fast" advance responsive to the operation of the program cam "fast advance" switch. More particularly, the operation of the "fast advance" switch SW6 puts positive voltage on the base of transistor Q7 over a circuit that extends from positive voltage through switch SW6, diode CR8 and resistor R61 to the base of the transistor Q7, to operate transistor Q7 to its conducting state.

When transistor Q7 operates, it removes the positive bias normally placed on the base of PNP transistor Q8 through resistor R62 by placing a ground on the base over a circuit that extends from ground through transistor Q7, conductor 168, diode CR3 and resistor R63. Transistor Q8 operates to conduct and remove the negative inhibiting voltage that was connected through resistors R64 R66, conductor 151 and diode CR9 to the gate of field effect transistor Q9.

With the removal of the negative bias from the gate, resistor R67 is connected to the timing terminal 13 of timer 152 through the drain and source electrodes of the field effect transistor Q9 shortening the time pulses considerably and causing the cam to move at a faster rate.

The collector of transistor Q7 is connected through load resistor R68 and to positive voltage on conductor 138. As long as transistor Q7 does not operate, transistors Q8, Q9, Q10 cannot operate and the cam cannot fast advance. The operation of transistor Q7 removes the positive drive voltage appearing on the base of transistor Q10 through resistor R68, R69. Therefore, transistor Q10 operates under control of terminal 14 pulses to provide pulses to point 160 to provide fast repetition pulses to transistor Q11, through diode CR6, resistor R76 and conductor 158.

The operation of switch SW6 also places an operating signal on transistor Q12 through resistor R88 to the base of the NPN transistor Q12. The base of the transistor is coupled to ground through resistor R89. The collector of transistor Q12 is coupled through conductor 156 and resistor R91 to the base of transistor Q13. The base of transistor Q13 is tied to ground through resistor R92. A filter capacitor C16 bridges resistor R92. The collector of transistor Q13 is coupled to the time base output terminal 14 of circuit 152 through diode CR12.

The operation of transistor Q12, therefore, transmits a ground to the base of transistor Q13, turning off Q13, if a positive voltage existed at the junction of resistors R73, R91. When transistor Q13 is off, it enables the output of circuit 152. Thus, the "fast advance" switch is made effective even if there are positive stop signals coming through diode CR2, conductor 74 and switch SW4.

The "stop" position of switch SW4 is coupled to resistor R91 through resistor R73, conductor 156. The signal received over conductor 156 is connected to the "stop" position of switch SW2 through resistor R72 and to the base of transistor Q10 through diode CR4 and resistor R71. Thus, the ground passing through transistor Q12 assures that the "fast advance" operation of the cam is effective, even when switch SW2 is operated to the "stop" position.

Field effect transistor Q9 can also be operated to the conducting condition; when, at the end of the program, switch SW4 is set at the "repeat" position. In that case, the positive signals passing through diodes CR2, conductors 74, 141 and resistor R56 to the base of transistor Q6 operate that transistor. That transistor is used in a differentiating circuit.

The base of transistor Q6 is tied to ground through resistor R97. The positive bias voltage is coupled to the collector of transistor Q8 through conductors 138, 139 and resistor R57. The differentiating elements include capacitor C17 coupled from the junction of the collector and resistor R57 to the junction of resistors R99 and R101. Resistor R101 is coupled to ground and resistor R99 is coupled to positive voltage on conductor 139. The junction of resistors R99 and R101 is coupled to terminal 2 of flip-flop circuit 144. The negative going spike on 176 acts to set flip-flop circuit 144 so that a positive or logic "1" signal is obtained at terminal 3. The positive "1" signal is coupled to the base of transistor Q7 through resistors R59 and R61 to operate transistor Q7 and consequently transistor Q8 and field effect transistor Q9, thereby "fast advancing" the program cam until a "start" signal is received through diode CR1 resetting circuit 144 as previously explained.

With circuit 144 reset, transistors Q7, Q8 and Q9 return to the normally non-conducting state. In this condition the pulses at the output of transistor Q11 are controlled by switch SW12 of circuit 152.

Means are provided for "jogging" the program cam a single step responsive to operating the program cam single step or jog switch SW13. More particularly, circuit 164 (another 555 commercial circuit) is provided, connected to serve as a one-shot multivibrator circuit. The circuit 164 is also connected to shape the pulse of the multi-vibrator.

When switch SW7 is operated, ground is connected to the trigger resistor-capacitor network R83 and C13 of circuit 164 causing a negative trigger pulse to appear at terminal 2. Terminal 2 is tied to ground on terminal 1 through resistor R80. A logic "1" output pulse then appears at output terminal 3. The output logic "1" is coupled through resistor R82 to point 160 and to the base of transistor Q11. The output of terminal 3 at logic "1" effectively causes transistor Q11 to operate, thereby causing conductor 162 to go to ground.

The junction of capacitor C13 and terminal 2 is connected by resistor R84 to positive voltage on conductor 166 through conductor 138 and 167. Reset terminal 4 is connected to conductor 166. Conductor 167 is connected directly to terminal 8 and also through resistor R86 to both terminals 6 and 7. The junction of terminals 6 and 7 and resistor R86 is coupled to ground through capacitor C14. Terminal 5 is connected to ground through a capacitor C16.

The operation of switch SW7 to its unoperated position disconnects the ground from the resistor-capacitor network. Thus, to single step the motor, switch SW7 is operated to its operated position. The operation of switch SW7 causes logic "1" pulse at the base of transistor Q11 which causes the voltage on conductor 162 to go from positive to negative and thereby to jog the motor one step.

Means are provided for stopping the impulse motor responsive to the operation of switch SW2 to the "stop" position. More particularly, when switch SW2 is operated to the "stop" position, then positive voltage is applied through resistor R72, conductor 156, and resistor R91 to the base of transistor Q13 causing transistor Q13 to conduct. The operation of transistor Q13 inhibits the output of counter 152; thus ending the pulsing provided at point 160 by the counter, thereby preventing the pulsed output on conductor 162 of transistor Q11 and stopping the rotation of the motor and the cam.

The operation of the timing circuit 61 is such that output pulses for operating the motor are provided at output conductor 162 when a positive pulse is received through diode CR1 and conductor 72 to operate transistor Q3, while switch SW2 is in the "motor run" position. If switch SW2 is in the "motor stop" position, then transistor Q11 is unoperated and there is no pulsed output of lead 162, unless certain other criteria, such as "fast advance" or "single step" controllers, are operated.

The positive signal received through diode CR2 and conductor 74 onto the wiper of switch SW4 is coupled to the base of transistor Q13 through resistor R73 and R91 to stop the counter 152 and consequently the advance of the motor 47.

The output of transistor Q13 is coupled from the collector of transistor Q13 through diode CR12 to terminal 14 of circuit 152. The positive voltage at the base of transistor Q13 causes transistor Q13 to operate and put a ground at the collector of transistor Q13.

However, it must be understood that if switch SW6 is operated for a fast advance, then the transistor Q13 is prevented from conducting. More particularly, for example, when switch SW6 is operated, then a ground signal is placed on the base of transistor Q13 over the conductor 156.

The ground on conductor 156 also prevents the positive signal from reaching the base of transistor Q10 through diode CR4 and resistor R71. However, the pulsed output of terminal 14 is transmitted to the base of transistor Q10 through diode CR13 and resistor R94.

When the signal to the base of transistor Q11 is being received from the counter circuit 152, then that signal is also transmitted through conductor 177, resistor R102, conductors 178 and 179 through capacitor C19 to the base of NPN transistor Q14. A capacitor C20 acts as an integrator and a by-pass path for conductor 179 to ground. A resistor R103 is connected from the coupling point of capacitor C19 and the base of transistor Q14 to ground.

Initially, the positive pulse passes directly through capacitor C20 until a voltage builds up on capacitor C20. Thus, capacitor C20 in conjunction with resistor R102 provides a timed delay circuit. Conductor 179 is connected directly to reset terminal 10 of circuit 152. Terminal 10 is coupled to trigger input terminal 11 through resistor R104. After an RC caused delay, the voltage on conductor 179 causes a current to pass through capacitor C19 immediately and provides a voltage across resistor R103. This turns on transistor Q14.

The collector of transistor Q14 is connected directly to terminal 14, the time base output of circuit 152, which is thereby clamped as long as transistor Q14 operates. Terminal 11 is integrated-by-passed to terminal 9 and ground through capacitor C21. The signal at reset terminal 10 and trigger terminal 11, which occurs after the delay caused by capacitor C20 in conjunction with resistor R102 acts to "reset" the timing and counter circuits and to start the time base oscillator operating again after the delay caused by resistor R104 and capacitor C21, and provide the pulsed output at terminal 14.

In review then, the internal RC oscillator runs causing a counter chain to count and to control the terminals 1-8 of circuit 152. The terminals 1-8 are sink points of the counter. After an RC delay turns on transistor Q14, transistor Q14 clamps terminal 14 which prevents the voltage on timing capacitor C17 from going positive. However, at this time a voltage on capacitor C20 provides a "reset" and trigger signal to terminals 10 and 11. Terminals 10 and 11 are coupled to reset and trigger a control flip-flop in the circuit 152. After a delay caused by resistor R104 and capacitor C21, the trigger circuit is enabled causing the counter logic to reset to logic "0".

Means are provided for selecting the base frequency of the timing pulse generated by circuit 152. More particularly, terminal 13 of circuit 152 is coupled to an internal time base oscillator. The base timing frequency is obtained from that oscillator and can be varied depending on the RC network coupled to terminal 13. Capacitor C17 is permanently coupled to terminal 13 through conductor 181 and 182. The other end of capacitor C17 is coupled to ground.

The junction point "X" of conductor 181 and 182 can be selectively jumpered to terminals 183, 184 or 186. Each of those terminals are tied to resistors of different values. Thus, by tying to the different terminals, different time groups may be selected. For example, terminal 183 is connected to conductor 169 and positive voltage through resistors R106 and R107 in parallel. Similarly, terminal point 184 is connected to resistors R108 and R109 connected in parallel to conductor 169. Terminal 186 is connected through series resistors R111 and R112 to conductor 169. The time group desired is selected by connecting the junction point "X" of conductors 182 and 181 to the terminal that gives the most desired time.

Thus, there are two means for varying the timing of output pulses—one is using switch SW12; and the other is selecting the terminal to which point "X" is connected. The different groups available in one preferred embodiment are 1 min.–255 min., variable in 1 min. increments; 1 hr.–255 hrs., variable in 1 hr. increments; and 6 hrs.–1530 hrs., variable in 6 hr. increments.

When only switch SW12a is operated to a "closed" position, then the time cycle per pulse is either 1 min., 1 hr., or 6 hrs. When only switch SW12h is operated, the time cycle per pulse is 128 min. or 128 hrs. or 768 hrs. When all of the switches SW12 are closed, the time cycle is 255 min., 255 hrs., or 1530 hrs., depending on the position of the jumper from point "X".

Means are provided for remotely starting and stopping the timing circuit. More particularly, terminals 187, 188 and 189 are provided. Terminal 187 is connected directly to conductor 138. Terminal 188 is connected to the "motor stop" position switch SW2 through diode CR11. Terminal 189 is connected to the "repeat" position of switch SW11 through conductor 141.

When it is desired to use a remote start signal, connect terminal 188 through the remote control to terminal 189. This will place a positive pulse on the base of transistor Q13 stopping the motor at the end of the program. (SW4 must be in the repeat position) Opening the connection between terminals 188 and 189 will cause the timing circuitry 61 to operate as previously described.

When it is desired to stop the operation of the motor, remotely, then the positive voltage from terminal 187 is connected to the "motor stop" position of switch SW2 through terminal 188, to place a positive voltage on conductor 156 through resistor R72. This positive voltage is applied to the base of transistor Q13 operating that transistor to stop the pulses from timing circuit 152. Switch SW2 should be in the "motor run" position in order to use remote "stop-run" switching.

Figure 6:
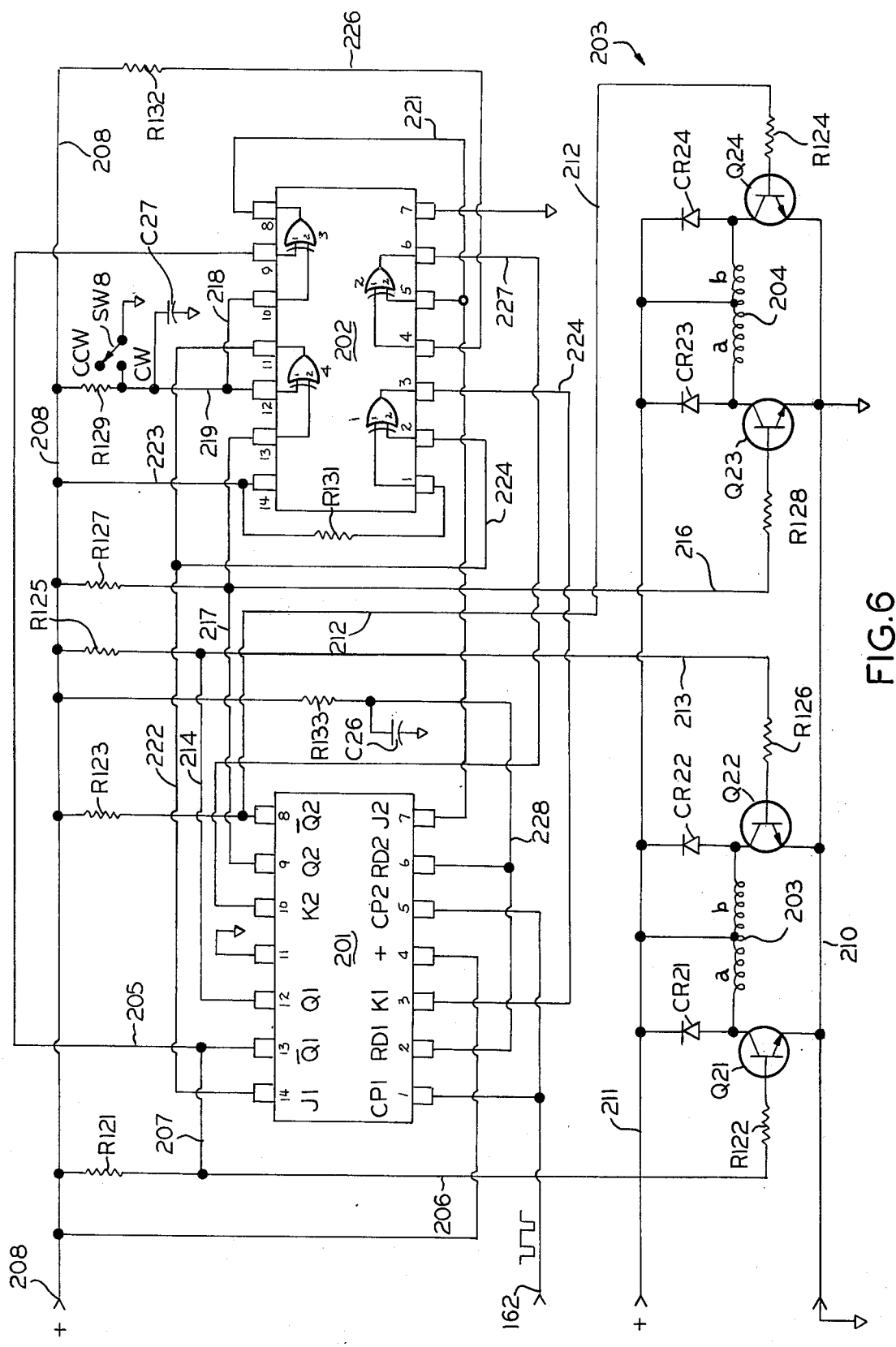

Integral to the timing circuit 61 shown in FIG. 5, is the timing logic controls of FIG. 6. Conductor 162 is connected directly to terminals 1 and 5 of logic circuit board 201. The logic circuit board is a dual JK flip-flop circuit commercially available as National Semiconductor Co. 7473. Circuit 201 functions in conjunction with the "quad-exclusive or" circuit 202 to provide the proper drive circuits, shown generally at 203. Circuit 202 is also commercially available as National Semiconductor Co. 7486.

The stepping motor has two coils—coils 203 and 204. Each coil is center tapped to provide two paths through each of the coils. For example, coil 203 has its "a" side and its "b" side. Similarly, coil 204 is divided by a center tab to provide an "a" side and a "b" side. Each side is controlled by a different transistor. Transistor Q21 controls coil 203a. Transistor Q22 controls coil 203b. Transistor Q23 controls coil 204a and transistor Q24 controls coil 204b. (The transistors are shown as single transistors for purposes of explanation; whereas in a preferred embodiment Darlington integrated amplifier circuits are used.)

A switch SW8 controls whether the stepping motor runs clockwise or counter-clockwise. The normal position is shown as counter-clockwise. When the switch SW8 is operated, the motor then is caused to run in a clockwise direction. There always have to be two coils operating, because this is a four phase system, so two transistors have to be turned on for moving the switch motor. It should be understood the other types of stepping motors could be used within the scope of this description with the correct logic and transistor hookup.

Before any pulse is delivered to the drive circuits, as shown herein, assume that the output of terminal 13 of circuit 201, which is a $\overline{Q1}$ circuit, is at logic "1" to operate transistor Q21; and that the output of terminal 9, which is $\overline{Q2}$ is also at logic "1" to operate transistor Q23.

The output of terminal 12, which is logic "0", is transmitted over conductors 214, 213 and resistor R126 to the base of NPN transistor Q22 to prevent that transistor from operating. Transistor Q21 operates over a circuit that extends from positive voltage on bus 208 through resistor R121, conductor 206 and resistor R122 to the base of transistor Q21 to cause transistor Q21 to operate and enable current to flow through coil 203a, going from conductor 211, coil 203a, transistor Q21 to ground bus 210. The logic "1" from terminal 9 enables positive voltage to be applied from conductor 208, through resistor R127, conductor 216 through resistor R128 to the base of transistor Q23. Current then flows from positive voltage bus 211, coil 204a and transistor Q23 to ground bus 210.

Each of the transistors has its emitter coupled directly to the ground bus 210. Current flows from a positive voltage bus 211 connected to the collectors of transistors Q21, Q22, Q23 and Q24 through the coils 203 and 204, when the transistors conduct; i.e. when there is a positive signal on the bases of those transistors. However, the logic circuitry always grounds the bases of two of the transistors to prohibit them from operating. For example, in the "initial" condition, ground is placed on conductor 213 and conductor 216 coming from terminals 12 and 9, respectively. These are the Q1 and Q2 outputs, respectively. So, according to this example, initially transistors Q21 and Q23 are operated and conduct.

Each of the collectors of the transistors are connected to the positive voltage bus through diodes CR21, CR22, CR23 and CR24, respectively. These diodes act to remove the inductive spikes that otherwise occur when the transistors are turned off to the unconductive state due to the inductance of the stepper coils.

The base of transistor Q24 is connected to positive bus 208, through resistors R123 connected in series with resistor R124 by conductor 212. Transistor Q22 is connected to positive bus 208 by resistor R125 connected in series with resistor R126 by conductor 213. Conductor 213 is also connected to terminal 12 of circuit 201 by conductor 214. Terminal 12 is the Q1 terminal of the circuit. Terminal 11 of circuit 211 is connected directly to ground.

The base of transistor Q23 is connected to positive bus 208 by resistors R127 and R128 connected in series by conductor 216. Conductor 216 is also connected to terminal 9 of circuit 201 by conductor 217.

Terminals Q1 and $\overline{Q2}$ provide a logic "0" output initially. Thus, there is no effect on transistors Q22 or Q24 at this time. They remain inhibited and unoperated. On the other hand, transistors Q21 and Q23 are operated. Thus, a pulse passes through coils 203a and 204b at this time. The stepping motor, once stepped to the position caused by the pulses in those particular coil halves, remains there until another pulse is placed into the circuit.

When a pulse is received at dual JK flip-flop, circuit 201 is set. Therefore, the terminals 13 and 8 now provide a logic "1" output and the terminals 9 and 12 now provide a logic "0" output. Therefore, transistors Q21 and Q24 now conduct. Thus, responsive to the first pulse, transistors Q21 and Q24 conduct. At the same time responsive to that first pulse, the "1" signal from $\overline{Q1}$ on terminal 13 is transmitted to the quad-exclusive OR circuit 202; and more particularly, to the input 1 of "OR" gate 3 of that circuit through terminal 9.

Terminal 10 of circuit 202 is connected to ground bus 208 through conductors 217, 218 and resistor R129. Terminal 10 is connected to input 2 of gate 3.

With the two positive inputs to gate 3, a logic "1" output is provided at terminal 8. This logic "1" output is carried by conductor 221 to input 7, which is a J2 input of circuit 201. Conductor 217 also extends to terminal 13 of circuit 202. Terminal 13 is connected to input 2 of exclusive "OR" gate 4. Input 1 of exclusive "OR" gate 4 is connected to positive bus 208 through terminal 12, conductor 219 and resistor R129. The output of gate 4 is connected to terminal 14, the J1 terminal, of circuit 201 through terminal 11 of circuit 202 and conductor 222.

Since "OR" gate 4 is receiving a positive input on both inputs, there is a logic "0" output at terminal 11 of circuit 202. At this time input 1 of exclusive "OR" gate 1 is connected to the terminal 1 of the circuit 201. From terminal 1 it is connected to resistor R131 and through conductor 223 to ground bus 208. The 2 input of gate 1 is connected to terminal 2 and through conductor 224 to conductor 222 which at this time has a "0" input on it. Therefore, there is a logic "1" output from gate 1 connected to terminal 3 and from terminal 3 of circuit 202 through conductor 224 to terminal 3 of the 201 circuit, which is the K1 terminal. "OR" gate 2 has its 1 input connected to terminal 4 and from terminal 4 through conductor 226, resistor R132 to positive bus 208. The 2 input of gate 2 is connected to terminal 5 of circuit 202 and from 5 to conductor 221 and terminal 8 or the output of gate 3 of circuit 202. The output of gate 2 is connected to terminal 6 and through conductor 227 to terminal 10, the K2 terminal of circuit 201. Since the input to gate 5 is "0", there is a "1" output at this time from gate 2.

Terminals 2 and 6 of circuit 201 are connected through conductor 228, series resistor R133 to positive bus 208. A filter capacitor C26 is connected from the junction of resistor R133 and conductor 228.

With the receipt of the next clock pulse, the output of Q2 changes from logic "1" to a logic "0", and the output of $\overline{Q2}$ from logic "0" to logic "1". The sequence desired in the counter-clockwise mode is to have, at the first step, the Q1 output at terminal 12 to be a "0" output, and the $\overline{Q1}$ output at terminal 13 to be a logic "1" output. The logic "1" output enables transistor Q21 to conduct and thereby energize coil 203a. The logic "0" output prevents transistor Q22 from conducting and thereby prevents coil 203b from being energized.

In step 1 (first pulse) of the counter-clockwise direction, the Q2 output at terminal 9 is a "0" output, thereby preventing transistor Q23 from operating and preventing coil 204a from being energized. The $\overline{Q2}$ output at terminal 8 is a logic "1" output, and it enables transistor Q24 to conduct, thereby energizing coil 204b. Thus, in the step 1, coils 203a and 204b are energized.

As the second clock pulse comes in, it is steered by the quad-exclusive "OR" circuit to change the Q outputs of the dual JK flip-flop so that the Q1 output is a logic "1"; the $\overline{Q1}$ output is a logic "0"; the Q2 is a logic "0"; and $\overline{Q2}$ is a logic "1". Thus, coils 203b and 204b are energized with the second step.

On the third pulse, the Q1 output remains at logic "1"; the $\overline{Q1}$ output remains at logic "0"; the Q2 output switches to a logic "1" and $\overline{Q2}$ switches to "0"; therefore, coils 203b and 204a are now energized.

With the receipt of the fourth clock pulse, the quad-exclusive "OR" gate pulse steers its pulse into the dual JK flip-flop so that the Q1 output now has logic "0"; the $\overline{Q1}$ output has logic "1"; the Q2 output has logic "1" and the $\overline{Q2}$ output has logic "0", energizing coils 203a and 204a.

The operation of switch SW8 changes the operation of the 202 exclusive "OR" circuit so that the coils are energized in a different sequence for causing clockwise operation. In the clockwise operation, the drive transistors are operated at the first step so that the coils 203a and 204b are energized. With the second step coils 203a and 204a are energized. With the third step coils 203b and 204a are energized. With the fourth step coils 203b and 204b are energized.

A filter capacitor C27 is provided to remove transient spikes which may be caused by the operation of switch SW8. The operation of switch SW8 in effect places a ground on conductor 219, which is input terminal 12 of circuit 202, and input 1 of exclusive "OR" gate 4. This changes the input to the J1 operation and causes the following Q outputs of circuit 201:

With the first step, output Q1 is logic "0"; the $\overline{Q1}$ output is logic "1"; the Q2 output is logic "0"; and the $\overline{Q2}$ output is logic "1". In the second step the Q1 output remains logic "0"; the $\overline{Q1}$ output is logic "1"; the Q2 output is logic "1"; and the Q2 output is logic "0". In the third step the Q1 output changes to "1"; Q1 output changes to logic "0"; the Q2 output remains logic "1"; and Q2 output remains logic "0". With the fourth step the Q1 output remains logic "1"; Q1 output remains logic "0"; Q2 output becomes logic "0"; and Q2 output becomes logic "1".

Thus, in the clockwise direction with step 1 transistors Q21 and Q24 are operated. In step 2 transistors Q21 and Q23 are operated. In step 3 transistors Q22 and Q23 are operated. In step 4 transistors Q22 and Q24 are operated. Thus, the steering circuits 201, 202 cause the drive circuits to operate in accordance with the following table:

| DIRECTION | PULSE NO. | OUTPUTS | | | | COILS | | | |
|---|---|---|---|---|---|---|---|---|---|
| | | Q1 | $\overline{Q1}$ | Q2 | $\overline{Q2}$ | 203a | 203b | 204a | 204b |
| Counter-clockwise | 1 | 1 | 0 | 0 | 1 | E* | | | E* |
| Counter-clockwise | 2 | 0 | 1 | 0 | 1 | | E* | | E* |
| Counter-clockwise | 3 | 0 | 1 | 1 | 0 | | E* | E* | |
| Counter-clockwise | 4 | 1 | 0 | 1 | 0 | E* | | E* | |
| Clockwise | 1 | 1 | 0 | 0 | 1 | E* | | | E* |
| Clockwise | 2 | 1 | 0 | 1 | 0 | E* | | E* | |
| Clockwise | 3 | 0 | 1 | 1 | 0 | | E* | E* | |
| Clockwise | 4 | 0 | 1 | 0 | 1 | | E* | | E* |

E* — energized

Thus, the impulse motor 47 is selectively driven clockwise or counter-clockwise responsive to the pulses generated in by the counter circuit 152 or by the single shot multi-vibrator circuit 164. The pulses are steered by the logic circuit to energize the coils in the order shown above.

Means are optionally provided for supply controls for auxiliary functions. More particularly card 102 is an auxiliary function card that is optional equipment. It includes the function relay card 96 and the functional controls, such as relay set point adjustments 37 and function indications 36. For purposes of explanation one half of the function relay card is shown in FIG. 3 and the other one half is shown in FIG. 4.

In FIG. 3, the operational amplifier that is shown as the cam follower amplifier 49 provides an output at 119 which is connected to conductor 126. When the function option is used, then conductor 126 is connected by optional jumpers 251 and 252. The jumper 254 connects the output of amplifier 49 to either the negative or the positive input of operational amplifier 253 using either a switch connection or a jumper, but in one preferred embodiment the connection is made via a jumper. For example, when jumper 251 is connected, then the output of operational amplifier 49 is connected through conductor 126, jumper 251, series resistor R151, jumper 254 to either the negative or positive input of operational amplifier 253. Ground is connected to the negative input of amplifier 253 through resistor R152. The operational amplifier 253 controls the operation of a silicon controlled rectifier SCR1. With the jumper 254a connected to the positive input, then relay K4 is normally operated until the cam program set point temperature equals the temperature selected for deenergization by the potentiometer P21; i.e. operational amplifier 253 provides a positive output until the actual temperature equals the set point temperature. When the selected temperature is reached, a negative output is provided by operational amplifier 253.

The output of operational amplifier 253 is transmitted through conductor 256 and resistor R153 to the gate 257 of silicon controlled rectifier SCR1.

The output of operational amplifier 253 also is fed back to the positive input over a circuit that extends through conductor 258 and resistors R156 and R164 in series to the positive input. The junction of resistors R165 and R156 in connected to ground through resistor R154. The junction of resistor R156 and the positive input of amplifier 153 is coupled through resistor R157 to the junction point of diode CR31 and capacitor C31. The other end of diode CR31 and capacitor C31 is connected to ground. The output of amplifier 253 is also fed back to the negative input of the amplifier through capacitor C32.

The junction point of resistor R153 and the gate of silicon controlled rectifier SCR1 is connected through resistor R157 to ground. On reaching the "set point", operational amplifier 253 provides a negative output which fails to turn on the silicon controlled rectifier SCR1, thereby deenergizing relay K4. Relay K4 is connected in a circuit that extends from alternating voltage at terminal 259 through the coil of relay K4, silicon controlled rectifier SCR1 to ground. Silicon controlled rectifier SCR1 is bridged by capacitor C33. The coil of relay K4 is bridged by capacitor C34 for retaining the relay operated during the negative half cycles of the alternating current signal, when silicon controlled rectifier SCR1 is turned off.

When relay K4 is operated, the contacts K4a and K4b operate, The operation of contacts K4a establishes an energization circuit for light emitting diode L6, extending from positive voltage at 260 through light emitting diode L6, resistor R159, contacts K4a and conductor 262 to ground.

The operation of contacts K4b disconnects the contact armature from conductor 263 and connects the armature to conductor 264. The armature of the contacts K4b of single pull double throw function contacts are available through the use of the function circuitry.

The negative output of operational amplifier 253 passes through diode CR32, resistors R161 and R162 to the junction point of resistor R157, diode CR31 and capacitor C31. Resistor R157, is coupled to the positive input of amplifier 253. The negative voltage fed back to the positive input of amplifier 253 saturates the amplifier which then maintains the negative output, nothwithstanding the input received by that amplifier over conductor 126. Thus, once the relay is deenergized, it remains deenergized even though the temperature drops below the selected temperature.

Means are provided for manually resetting the circuitry so that relay K4 can again reenergize, when the cam indicated temperature signal is less than the relay operating "set point". More particularly, a field effect transistor Q31 and associated circuitry are provided. Its gate is biased to negative voltage through resistor R163. A push button reset switch SW31 is provided. When switch SW31 is operated, ground is connected to the gate of transistor Q31 to switch that transistor to the conducting state. The negative output of operational amplifier 253 is established responsive to the signal on conductor 126.

Therefore, operational amplifier 253 is saturated when it has a negative output, since that negative output is transmitted through conductor 256, diode CR32, resistors R161, R162 and R157 to the positive input of the amplifier.

The input to the operational amplifier, whether jumpered at 254 or at 254a, is the negative voltage received from conductor 126 matched against the voltage received from potentiometer P21 having a winding connected between positive voltage and ground. The wiper of potentiometer P21 is connected through resistor R166 to the junction of resistor R151 and the jumper point 254.

When the jumper 254a is connected to the high side; i.e. to the positive input of operational amplifier 253, then silicon controlled rectifier SCR1 is operated to conduct by the positive gate signal and conducts throughout the positive portion of the alternating current input signal. Consequently, relay K4 remains energized until a "set" relay energization point is reached; i.e. a negative output is obtained from operational amplifier 253; since at the desired "set point", the output becomes negative and silicon controlled rectifier SCR1 is no longer turned on on the positive portions of the alternating current input.

The relay set point adjustment potentiometers are shown in FIG. 2 at 37.

When jumper 254 is coupled to the negative side of the operational amplifier 253, then the output of the amplifier is negative and the relay remains deenergized until the desired "set point" is reached, at which time the output of the amplifier becomes positive. Relay K2 operates off a very similar circuit, except there is no manual reset circuitry. More particularly, jumper 252 connects conductor 126 through resistor R167 and jumper 261 connected to the low (negative) or high (positive) side of the input of amplifier 262.

The output of the amplifier 262 is connected through conductor 263, resistors R168 and R169 to ground. The junction point of resistors R168 and R169 is coupled to the gate of the silicon controlled rectifier SCR2. The negative input of amplifier 262 is also connected to ground through resistor R171 and the output of amplifier 262 is connected back to the negative input through capacitor C34.

The positive input of amplifier 262 is grounded through series resistors R172 and R173. The junction of resistors R172 and R173 is connected to the output of amplifier 262 at conductor 263 through resistor R174. Resistor R174 is in the order of 5 meg ohms; whereas, resistors R172 and R173 are 8,000 and 1,000 ohms, respectively.

Means are provided for controlling the output of operational amplifier 262 to cause it to change from negative to positive or positive to negative, responsive to the "set point" signal received over conductor 126. More particularly, potentiometer P22 is provided having its winding connected between positive voltage and ground. The wiper of potentiometer P22 is connected through resistor R175 to jumper 261. Connecting the jumper to the high or low amplifier input determines whether the relay K2 is normally energized or deenergized until the desired "set point" signal is received on conductor 126. As long as the output of amplifier 262 is positive, then silicon controlled rectifier SCR2 conducts. When it conducts, the energization circuit for relay K2 is enabled. The energization circuit for relay K2 extends from alternating current voltage through conductor 263, the winding of relay K2, silicon controlled rectifier SCR2 and conductor 264 to ground.

A capacitor C36 is connected bridging the winding of relay K2 to maintain relay K2 operated for a short period of time. A filter capacitor C37 is connected between the junction point of the winding of relay K2 and the emitter of silicon controlled rectifier SCR2 to ground.

Responsive to the energization of relay K2, contacts K2a and K2b operate. The operation of contacts K2a enables light emitting diode L7 through a circuit that extends from positive voltage on conductor 266 through light emitting diode L7, resistor R176, contacts K2a and conductor 267 to ground. Contacts K2b, when operated by relay K2, disconnect fuse terminal 268, which normally goes through fuse F2 and the armature of contacts K2b to conductor 269. With the operation of relay K2, the armature of contacts K2b connects fuse terminal 268 to conductor 271.

Means are provided for jumping conductor 122 to the inputs of amplifiers 253 and 262 in place of conductor 126. More particularly, jumpers 272 and 273 shown in dashed lines are provided for this purpose. When jumpers 272 and 273 are in place, the junction relays K2 and K4 are connected to operate as a function of the ouput of the timing amplifier 84 whose output appears on conductor 121 coupled to conductor 122.

Relays K3 and K1 are shown in FIG. 4. Here they are shown coupled to conductor 122 by jumpers 274 and 276. More particularly, jumper 274 couples conductor 122 through resistor R1777 and jumper 277 to the negative input of function operational amplifier 278. Potentiometer P22 is provided as relay set point adjustment to set the point at which relay K3 operates.

The winding of potentiometer P22 is connected between positive voltage and ground. The wiper of potentiometer P22 is connected through resistor R178 and through jumper 277 to the negative input of amplifier 278. Thus, the negative input of amplifier 278 gets the summation of the varying voltage provided by the timing potentiometer and the voltage set by the relay set point adjustment potentiometer P22. With jumper 277 connected to the negative or low input of amplifier 278, potentiometer P22 is adjusted until a positive output is obtained from amplifier 278 at the set point desired.

The feedback circuit couples the output of amplifier 278 into the negative input of the amplifier 278 through capacitor C38. The negative input is also grounded through resistor R179.

Another feedback circuit connects any negative output of amplifier 278 to the positive input through diode CR33, resistors R180, R181 and R182. A clamping diode CR34 is coupled between the junction of resistors R181 and R186 and ground. The diode is bridged by capacitor C41. The positive input is also connected to ground through resistors R183 and R184 connected in series. The junction of resistors R183 and R184 is connected back to conductor 279 through resistor R186. The value of resistor R186 is in the order of 5 meg ohms; whereas the value of resistors R180, R181, R182 is in the order of 25,000 ohms.

When there is a negative output on conductor 279, the feedback can proceed over the lower resistance path, since diode CR33 is enabled by the negative voltage. The negative voltage tends to saturate operational amplifier 278 and retain the negative output. A positive output of amplifier 278 is fed back through the large resistance of resistor R186; whereas, the negative voltage by-passes that resistor.

Conductor 279 is coupled to the gate of silicon controlled rectifier SCR2 through resistor R187 coupled to ground through resistor R158. Thus, resistors R188 and R187 act as a voltage divider network. As soon as the output of amplifier 278 goes positive, then silicon controlled rectifier SCR2 conducts. When silicon controlled rectifier SCR2 conducts, the energization circuit for relay K3 is enabled. The energization circuit for relay K3 extends from alternating current at 281 through the coil of relay K3 through silicon controlled rectifier to ground. The coil of relay K3 is bridged by a capacitor C39 which retains and is thereby operated for a short period of time. The silicon controlled rectifier SCR2 is also bridged by a filtering capacitor C41 extending from the emitter of silicon controlled rectifier SCR2 to ground.

In the circuitry of amplifier 278 a negative output is perpetuated by the feedback circuit previously described. Thus, once silicon controlled rectifier SCR2 is deenergized, and there is a negative output from amplifier 278, then the relay K3 cannot be reenergized even when the set point voltage at the amplifier input goes below a certain desired limit.

Means, however, are provided for resetting the energization control in the function relay circuitry. More particularly, switch SW32 is provided along with field effect transistor Q32 and associated circuitry. Transistor Q32 is normally biased to the non-conducting condition by negative voltage extending through resistor R189 to the gate of transistor Q32. The operation of switch SW32 grounds the gate of transistor Q32, thereby operating the field effect transistor to connect ground through the source and drain of the field effect transistor to resistor R180, diode CR33 to conductor 279 killing the negative feedback which had been saturating amplifier 278. Thus, the amplifier 278 again returns to the condition where its output follows the signal resulting from the sum of the signal on conductor 122 and that received from potentiometer P22. A clamping diode CR34 is provided extending from the junction of resistors R181 and R182 to ground.

The operation of relay K3 causes contacts K3a and K3b to operate. The operation of relay K3a completes an energization circuit for light emitting diode L4 which extends from positive voltage at 281 through the light emitting diode L4, resistor R191 and contacts K3a to ground.

The operation of contacts K3b disconnects conductor 282 from fused conductor 283 and connects the fused circuitry, instead to conductor 284. The fuse is shown as fuse F3.

It should be noted that switch SW31 and switch SW32 can be shorted out to assure the automatic reenergization of function relays K4 and K3 if so desired.

Conductor 88 is connected to operational amplifier 286 through jumper 276, resistor R192 and jumper 287 connected either to the low (negative) or high (positive) side of the amplifier. When jumper 287 is connected to the high side, then relay K1 is operated by a signal below the desired set point signal and deenergized when the signal goes above the set level. When jumper 287 is connected to the low side, then relay K1 is operated by a signal above the desired set point and deenergized below the set point. Thus, when jumper 287 is connected to the high side, then the relay K1 deenergizes, when the desired set point level is reached. It normally remains deenergized above the set point level and is reenergized below the set point level. When jumper 287 is connected to the low side, relay K1 is operated above the set point and deenergized below the desired set point level. Unlike the circuitry of relay K3 the circuitry of relay K1 enables that relay to reenergize whenever the signal input to the relay controlled circuitry is below the desired set point.

A positive signal to be summed with the signal received from conductor 122 through resistor R192 is provided and is adjustable. More particularly, potentiometer P23 has its winding connected from positive voltage to ground. The wiper of potentiometer P23 extends through resistor R193 to jumper 287 for summation with the signal received from resistor R192. The low input of amplifier 286 is connected to the amplifier output through capacitor C32 and to ground through resistor R194. The high input to amplifier 286 is connected to ground through series resistors R196 and R197. The junction point of those resistors is connected to the output of amplifier 286 through resistor R198.

The output of amplifier 286 extends to the gate of silicon controlled rectifier SCR4 through resistor R199. The junction of resistors R199 and the gate of silicon controlled rectifier SCR4 is connected to ground through resistor R201. Thus, resistors R199 and R201 act as a voltage divider network.

The operate circuit for relay K1 extends from alternating current power source at 288 through the coil of relay K1 and silicon controlled rectifier SCR4 to ground. A smoothing capacitor C43 bridges the coil of relay K1. A filter capacitor C44 bridges the silicon controlled rectifier and extends from the emitter of that rectifier to ground.

The energization of relay K1 causes contacts K1a and K1b to operate. The operation of relay contacts K1a enables a light emitting diode circuit. More particularly, responsive to the operation of contacts K1a, light emitting diode L5 is energized through a circuit that extends from positive voltage at 289 through the light emitting diode L5, resistor R202 and contacts K1a to ground.

The operation of contacts K1b opens a circuit that previously extended from fused conductor 291 through fuse F1 to conductor 292 and closes the circuit extending from the fused conductor 292 to conductor 293.

Means are provided for selectively coupling the function circuits for relays K1 and K3 to the temperature amplifier output and conductors 119 and 126, carrying that output. More particularly, jumpers 294 and 296 shown in dashed lines are provided for connecting conductor 126 to resistors R177 and R192, respectively. Thus, the user of the system can optionally connect the function resistors to the output of the temperature amplifier or the timing amplifier.

Figures 7, 8:
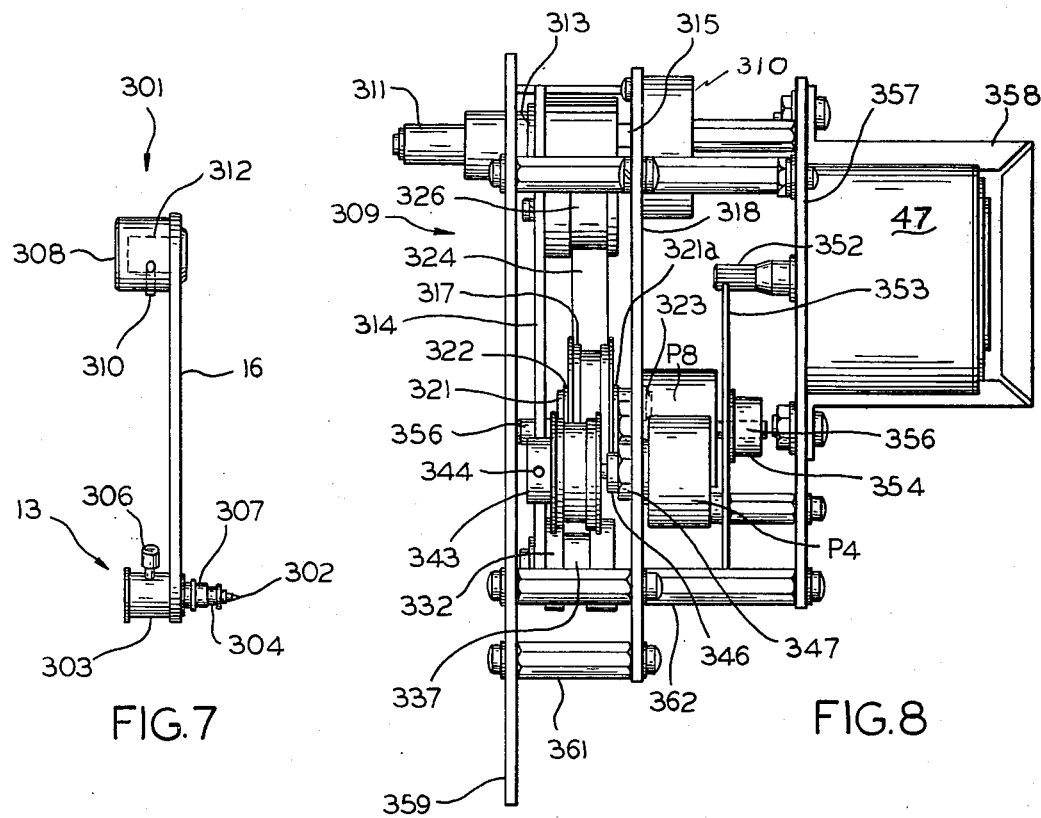
FIG. 7 is a side view showing of the cam follower arm showing the scriber mechanism in the extended position.
FIG. 8 is a side view of the mechanical assembly showing the cam drive motor and the cam follower mechanisms.

Means are provided for using the cam follower as a cam blank scriber. As shown in FIG. 7, the cam follower arm assembly 301 comprises arm 16 attached to the cam follower section 13. The cam follower section 13 comprises the scriber 302 which is used to cut new cams when the system is used for preparing cams. A scriber bearing receptacle 303, enables the scriber post 304 to facilitate the use of the cam follower section 13 in following the contour of the cam. At the other end of arm 16 is the arm cap 308. It fits around a post 311 on the mechanical assembly 309, shown in FIG. 8.

Means, such as threaded fastener 310, are provided for locking the cam follower arm assembly 301 to the post 311. When the cam follower arm is used as a cam follower, then scriber 302 is pressed into the receptacle 303 so that it is telescoped into the receptacle. At that time set screw 306 is turned to lock the scriber in place.

When the scriber cam follower arm is used as a scriber, then set screw 306 is loosened until the scriber is fully withdrawn. The scriber is then locked in position to etch or scratch the aluminum blank from which a cam is cut.

The mechanical assembly 309, shown in FIG. 8, includes the post or cam arm shaft 311, which fits into the cavity 312 of cam arm cap and is held in place by set screw 310. A second set screw is provided and is removed 90° from the first set screw.

Figure 9:
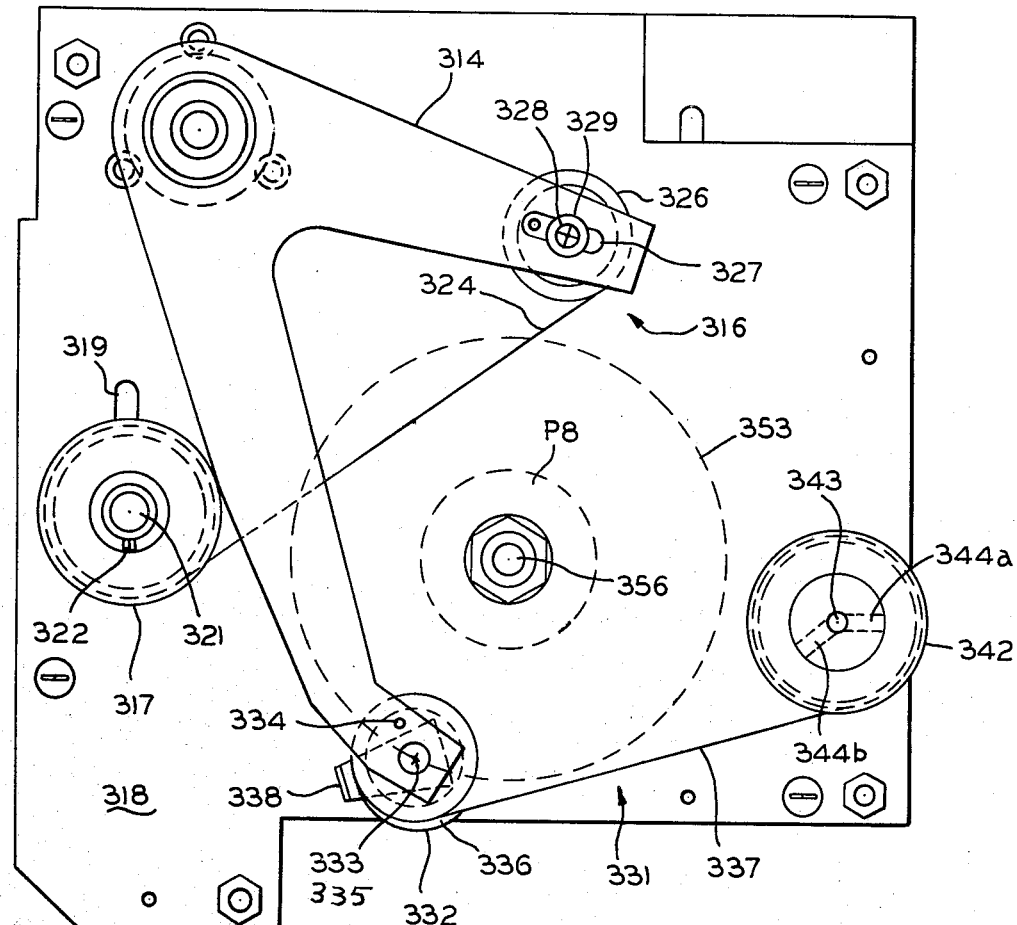
FIG. 9 is the plan view of the assembly of FIG. 8.

Shaft 311 has a shoulder portion 313 for receiving thereon negator arm linkage 314, shown in FIG. 9. So when the cam follower arm 16 is caused to move by variations in the cam contour, shaft 311 is rotated. The rotation of shaft 311 causes the broader base portion 313 to also rotate and to thereby move the negator linkage 314. The combination shaft-bearing 311 is bearing mounted over a shaft 315 in mounting flange 310 to assure smooth non-interrupted rotation.

Means are provided for maintaining the cam follower juxtaposed to the contour of the cam in spite of the many variations in that contour. More particularly, negator spring bias assemblies 316 (FIG. 9) and 331 are provided. The negator bias assembly 316 includes a negator spring drum pulley 317 mounted on plate 318. (Negator springs are commercially available through Hunter Spring Co. for example).

The spring drum pulley 317 is equipped for mounting to plate 318 utilizing mounting slot 319. A pulley shaft 321 and fastening means, such as truarc rings 322, are provided to maintain the pulley on shaft 321. The pulley shaft 321 is shown coupled to plate 318 using a Phillips head threaded fastener 323. A second truarc ring 322a retains the pulley 317 on the shaft 321 above the plate 318. The negator spring 324 extends to a negator spring drum 326. The negator spring drum 326 is coupled to the negator arm 314 at slot 327 using any well known means, such as threaded fastener 328 and washer 329. Slots 319 and 327 allow adjustment of the negator positions, to vary the actual force applied by the negator spring.

The negator arm and associated negator springs also provide another function and that is compensating for gravitational forces and minimizing backlash by coupling cam follower to the temperature potentiometer. The temperature potentiometer negator spring assembly 331 comprises a negator spring drum 332 affixed to the negator arm 314 with means, such as threaded fastener 335.

Pin means 334 are provided to keep negator spring drum 332 from rotating. A snubber spring 336 is held clamped against the negator spring 337 by snubber clamp 338 held by fastener 333.

Figure 10:
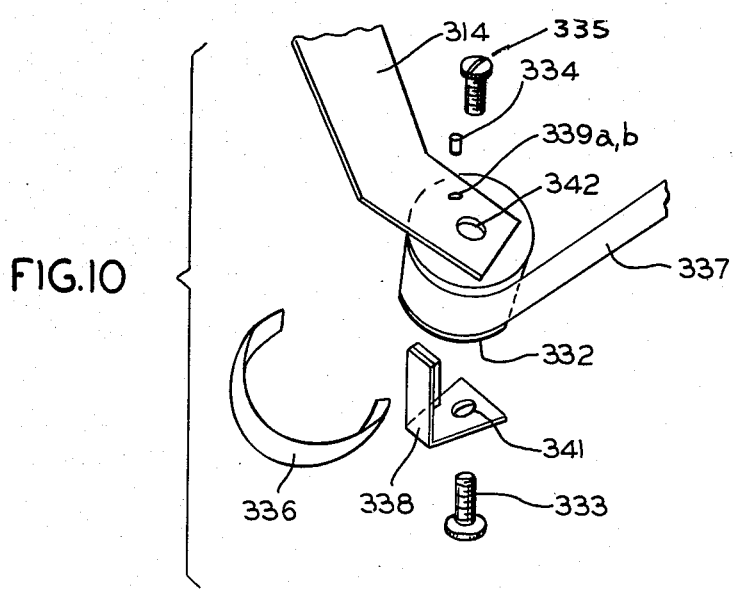
FIG. 10 is a pictorial showing of the attachment of the negator spring to the mechanical assembly of the cam follower arm.

The clamping apparatus and assembly are shown in the exploded view of FIG. 10. Therein it is better seen how pin 334 fits into pin holes 339a and 339b which extend through arm 314 and drum 332 to keep the drum from rotating. The clamp 338 is held to the drum by any well known threaded fastener, such as fastener 333, which extends through aperture 341 on clamp 338 and into the drum 332. The drum 332 is held to plate 314 with fastener 335.

Any movement of the drum 332 on arm 314 causes movement; ie. winding or unwinding, of negator spring 337. The movement of negator spring 337 causes negator pulley 342 to rotate clockwise or counter-clockwise. Pulley 342 is mounted to a temperature potentiometer shaft 343 using means, such as set screws 344a and 344b. The potentiometer shaft 343 is connected to the temperature potentiometer P4. Potentiometer P4 as seen in FIG. 8, is mounted adjacent to plate 318 on the side opposite the negator springs utilizing the threaded flange 346 and threaded nut 347.

The characteristic of the negator springs is such that no matter how much of the spring is removed from the drum, the force remains constant. As the cam follower moves, the negator arm, tied to the same shaft 311, also moves. Potentiometer spring assembly 331 exerts a force to wind up the potentiometer as well as to hold the cam follower against the cam. However, the force is too great. Therefore, the spring bias assembly 316 is used to counteract a part of that force. Also, the spring bias assembly is angled to apply the correct vector force due to compensate for the gravitational pull on the cam arm and linkage.

Means are provided for moving the cam, such as drive motor 47. In a preferred embodiment drive motor 47 utilizes an incremental drive design which moves the cam 0.04° of arc per impulse (considering a 360° total revolution) provided by the previously discussed digital timer and steering logic. The timing of these impulses is selected with time group switches and the time selection jumpers. An advantage of the incremental drive motor is that it is not dependent upon the line frequency or voltage. It can be driven forward or backward with precise single steps or it can be fast advanced forward or reversed.

Hysteresis and backlash are practically eliminated, since synchronous motors with their attendant multi-stage gear trains are not necessary in this arrangement.

Extending from the impulse motor 47 is the pinion gear 352. It is matched with a main drive gear 353 which has an anti-backlash hub assembly 354 mounted around a shaft 356. The shaft 356 extends through a timing potentiometer P8. The rotation of drive gear 353 causes rotation of the wiper of the potentiometer P8 thereby indicating a position vs. time relationship. The shaft 356 extends above mounting negator arm 314 and is available for mounting the cam or the cam blank thereon.

The impulse motor 47 is mounted to a bottom plate 357 in any well known manner. A power transformer 358 is visible in the background. A front plate 359 is positioned above the negator arm assembly 314. The plates are separated by standards, or posts, such as standards 361 and 362, separating the front plate 359 and intermediate plates 318; and the intermediate plates 318 and the rear plates 357, respectively.

Figure 11:
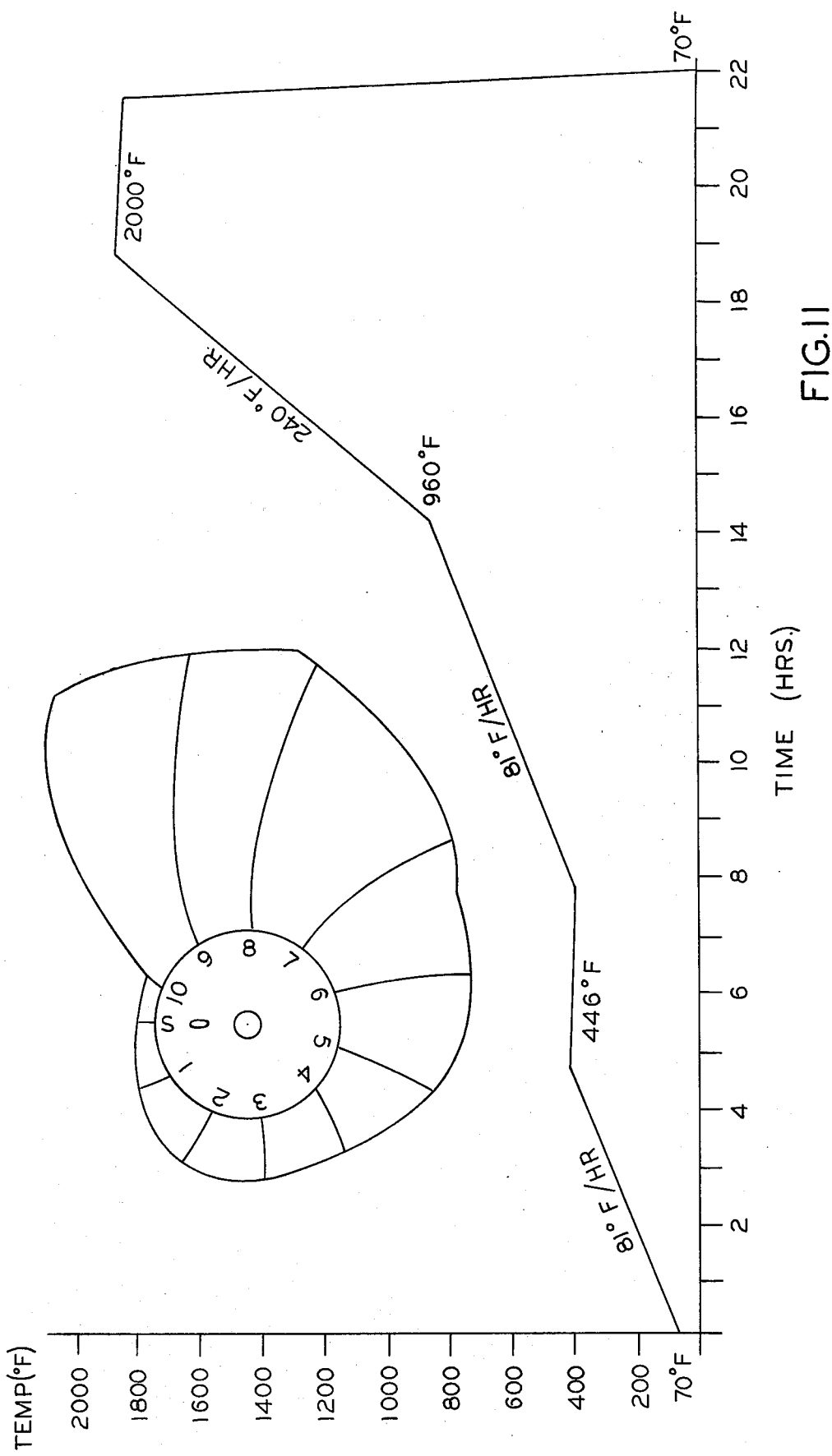
FIG. 11 is a graph of a prototype cam showing a typical time temperature program.

The rotation of the impulse motor 47 rotates the cam to generate the set point desired at the time desired. An illustrative example of a program is shown projected orthographically. Thus, when using the cam axis, the function, or in this case the temperature axis, is represented by the radial distance from the center of the cam; while the time axis is represented by the angular distance from the starting point. The relationship of the orthographic projection of the cam program is shown in FIG. 11. Therein the starting point "S" on the cam represents "0" on the abscissa, or "X" axis.

From the graph it is seen that this is above 70° F. on the ordinate, or "Y" axis. The slope of the curve remains constant for the first approximately five hours of the program. That means on the cam the rate of change of the radial distance from the center to the contour of the cam remains constant. Thus, on the illustrative graph, the 81° F. per hour rate of change continues for approximately 5 hours. On the cam the rate of change of the radial distance from the center of the cam to its contour remains constant for approximately two and one half divisions.

From that point on the cam to approximately the fourth division, there is no change in the radial distance from the center of the cam to its contour. This is represented by the straight line on the graph at 446° F.

From the fourth division on the cam until right before the seventh division on the cam the rate of change of the radial distance of the cam contour remains constant at approximately 81° F. per hour. This is shown by the slope of the curve between approximately the eighth division and shortly before the fourteenth hour.

From approximately before the seventh division until slightly after the eighth division, there is a new constant rate of change represented on the graph by the 240° F. per hour slope occurring at 960° F. This new rate of change of the radial distance of the cam contour continues until slightly after the eighth division where the rate of change becomes constant at 2000° F.

The rate of change and the radial distance from the center of the cam to the contour remains constant until approximately the tenth division when it again goes back down to the original temperature.

While in FIG. 11 a decimally divided cam has been shown, cam blanks are also made available which are divided in clock time; i.e. which are divided by 24.

In operation the cam program controller system can be utilized either for preparing a new cam or for controlling an industrial process in accordance with the time function program described by the contour of the cam. To use the system to prepare a new cam, the push button "operate"—"set up" switch SW3 is left in its normal or unpushed state. The main power switch SW1 is turned on and the motor switch SW2 is turned to the "run" position.

The user decides whether to use a decimal division cam blank or a clock division cam blank. The selected cam blank is placed onto the cam shaft 356 and a hub (not shown) extending through the plate 359 of the cam program controller.

The cam blank is set so that the scriber 302 of the cam follower arm 16 is aligned with the start line "S" on the cam. The cam follower arm 16 moves around hub 17 which moves the wiper 48 of the cam follower potentiometer P4, to provide a signal, as previously described, to the cam follower amplifier 49. The amplified signal output of amplifier 49 is transmitted to the meter of the controller 52 associated with the cam program equipment or to the separate set point indication meter 59.

The meter indicates the function equivalent, such as the temperature equivalent of the position of the cam follower. When the reading on the meter is the function desired by the program, at the start of the program, a scribe mark is made on the cam blank using scriber 302. More particularly, the scriber is positioned abutting the cam blank and the slow step switch SW7 is operated to scribe the cam blank.

The cam motor is then jogged to the next time line division using switch SW7. Once again, the cam follower arm 16 is moved to move the cam follower potentiometer P4 until the desired temperature is indicated on the meter being used. Again, the scriber is used to scribe a mark on the cam blank.

The operation is continued until the entire program is layed out on the cam. It should be noted that the cam moves at approximately 0.04° per pulse and the scriber can be used to mark the cam blank at whatever rotational position is required to assure an accurate cam.

After the cam blank is marked with the scriber, it is removed from the system. The scribed marks are joined as smoothly as possible and the blank is cut with the usual means, such as a metal saw. Then the cam is returned to its place on the panel for use in controlling a process.

When used in controlling a process, switch SW3 is operated to the "operate" position by pushing push button switch SW3 down. The position of the switch is protected by a lock out pawl 26. The time of the program is set by attaching jumpers from point "X" to either terminals 183, 184 or 186. This provides the time group desired; for example, 1 min. to 255 min., in 1 min. increments; 1 hr. to 255 hrs., in 1 hr. increments; or 6 hrs. to 1530 hrs., in 6 hr increments. The amount of program time in the selected group is then set using the thumb switches SW15a–h.

Once again, the motor "run" or "stop" is turned to the "run" position. With switch SW3 in the "operate" position, the output of the amplifier 49 is the "set point" provided by the cam. It may be shown on meter M1 of the controller 52 or on the optional set point meter 59 coupled into the system.

The "set point" signal which may be a temperature "set point" signal and in a preferred embodiment is a temperature "set point" signal, is provided at the output of amplifier 49 and is fed into a controller 52 and used for controlling the temperature of the process. With the cam at the "start" position light emitting diode L2 is energized and gives a "start" indication, responsive to signals from the timing potentiometer P8 and the timing amplifier 84. Start signals originating at potentiometer P8 and amplifier 84 are used by the timing circuit 61 to control the generation of pulses to step the motor 47.

The rate of the pulses provided is governed by the position of the jumpers of circuit 61 and the armature of switch SW15. The "fine start adjust" potentiometer P12 can be used to remove up to 15% of the beginning of the program. In a similar manner potentiometer P14 can be used to remove any portion of the end of the program. Thus, an end signal can be obtained from the system wherever desired by properly adjusting potentiometer P14. The capability of varying the start point and the end point of the program adds to the versatility of the system. It is also helpful in preparing a cam program, when the overall time of the program is not divisible by 10 or 24. For example, if a 7 hr cycle is required, neither the clock cam (24 division) nor the decimal cam (10 division) is readily divided by 7. However, by adjusting the end program potentiometer P14 to end the program at 7 units on the decimal cam, an easily read program cam is obtained. Each major division is then 1 hr., each minor division is then 30 min. and each sub-minor division is 6 min.

The start from amplifier 84 is used in start and end program circuit 71 to generate start signals. The start signals are transmitted to the timing circuit 61 to assure that timing pulses are received by the motor 47 at the start of the program to move the cam through the program. The start indicator light L2 will remain on until the end of the program is reached.

When the end of the program is reached the signal from amplifier 84 is used in the stop at end or repeat program circuit to produce "stop" signals. Indicator L2 is no longer energized, since circuit 71 is no longer producing start signals. Instead, indicator L3 is energized by the "stop" signals and the "stop" signals are transmitted to the motor timing circuits 61. These "stop" signals, as previously explained, stop the motor, unless the system is set for automatically repeating the program.

If the system is set to automatically repeat the program, then the "stop" signals cause the motor to be fast stepped to the start position. Whenever necessary, the motor can be reversed using switch SW8.

The cam can be stopped at any time by operating the motor "run" or "stop" switch SW2, even though the "set point" output is still generated. Thus, the system can be used to produce a single "set point" signal, as well as a continuously varying "set point" signal.

At the start of the program and at the end of the program, adjustments are to be made either when the start is not at the "S" point of the cam or when the end of the program is at the "S" point of the cam. Generally, to start the program, the cam is rotated using the fast step switch SW6 and the slow step switch SW7 until the cam follower is at the chosen start point of the program which should be within 1½ decimal divisions of the "S" point (15% of the total usable cam (335°)). The start fine adjust potentiometer P12 is rotated clockwise until the start program signal indicator L2 goes off. Then the potentiometer P12 is turned counter-clockwise until the L2 indicator just turns on; i.e. when the start signal on conductor 72 first originates.

The end of program adjustment is accomplished by obtaining the end of program signals at the point at which the end of the program is desired. The cam is rotated using the fast and slow step switches until the cam follower is at the chosen end point of the program. Then the end of program potentiometer P14 is first turned clockwise until stop signal indicator L3 turns off and subsequently turned counter-clockwise until the indicator L3 turns on. This again is the point at which the end signals first appear. After the adjustments are accomplished, the cam is moved to the start position and the program commences.

In addition, to the extreme versatility offerred by the cam program controller systems described herein, such as the ability to prepare the cam program on the system, the ability to adjust the programs without changing the cam by the use of the time selector jumpers and time selector switches, and the ability to vary the length of the program using the fine stop potentiometer and the fine start potentiometer, the system also offers the function cards previously described. The function card can be used to vary the time of the program during the program.

While the principles of the invention have been described above in connection with specific apparatus and applications, it is to be understood that this description is to be made by way of example only and not as a limitation of the scope of the invention.

We claim:

1. An improved cam program controller system for controlling processes by providing set point signals representing time function relationships, said system including a cam having a contour representing a program of set point signals, stepping motor means for rotating said cam independently of line frequency, cam angular position indicating means independent of the cam contour, whereby the time position of the cam program is indicated, cam follower means juxtaposed to said cam contour for moving responsive to variations in the distance of the contour of the cam, means responsive to the movement of said cam follower means as said cam rotates for providing said set point signals, and control means for using said set point signals to control a process.

2. The improved cam program controller system of claim 1 wherein said means for rotating said cam as a function of time comprises pulse generating means, and steering logic means for steering pulses of said pulse generating means to said impulse motor in the proper sequence to move said impulse motor in the direction desired.

3. The improved cam program controller system of claim 2 wherein said pulse generating means comprises programmable timer means, said programmable timer means including means for varying the base frequency of the pulses generated by said timer means, and means for varying the number of pulses provided by said timer means in a given sequence of pulses.

4. The improved cam program controller system of claim 1 wherein said angular position indicating means comprises time potentiometer means, means for coupling the wiper of said time potentiometer means to said motor to rotate with said motor, and means for connecting said time potentiometer means to provide a signal indicating the angular distance of said rotation.

5. The improved cam program controller system of claim 4 wherein start circuit means are provided operated responsive to the signal from said time potentiometer for providing start signals at the starting point of said cam, and means responsive to said start signals for causing said pulse generating means to provide pulses to said impulse motor to thereby initiate rotation of said cam.

6. The improved cam program controller system of claim 4 wherein end circuit means are provided operated responsive to the signal from said time potentiometer for providing end signals at the end point of said cam program, and means responsive to said end signals for inhibiting said pulse generating means to prevent said pulse generating means from transmitting pulses to said impulse motor thereby stopping said impulse motor.

7. The improved cam program controller system of claim 6 wherein means are provided for causing said program to automatically repeat responsive to the receipt of said end signals.

8. The improved cam program controller system of claim 5 wherein means are provided for causing the start signals to initiate at a point removed from the start point of the cam.

9. The improved cam program controller system of claim 6 wherein means are provided for causing the end signals to commence when said cam follower is rotated a desired distance.

10. The improved cam program controller system of claim 4 wherein start circuit means are provided for supplying start signals responsive to signals received from said time potentiometer, means responsive to said start signals for causing said programmable timer means to provide pulses to said impulse motor to rotate said cam, end circuit means provided for supplying end signals responsive to the position of said time potentiometer at the end of said program, means responsive to said end signals for inhibiting said programmable timer means to prevent said timer means from transmitting pulses to said impulse motor thereby stopping said impulse motor.

11. The improved cam program controller system of claim 4 including means for stopping said impulse motor while said set point signal continues.

12. The improved cam program controller system of claim 3 including motor speed control means for varying the time constant of the base frequency signal provided by said programmable timer whereby said motor is caused to step at a higher rate of speed.

13. The improved cam program controller system of claim 10 wherein means are selectively provided for preventing said end signals from inhibiting said programmable timer.

14. The improved cam program controller system of claim 10 including means for providing single discrete pulses to said impulse motor whereby said impulse motor is stepped one step at a time.

15. The improved cam program controller system of claim 4 wherein means are provided for selectively steering pulses to the impulse motor so that said impulse motor operates either in a clockwise direction or a counter-clockwise direction.

16. The improved cam program controller system of claim 4 wherein functional switch means are provided, and means for electrically operating said functional switch means responsive to the electrical value indicative of said cam rotating through a desired angular rotation, whereby external functions can be controlled at any desired position on said cam.

17. The improved cam program controller system of claim 16 wherein means are provided electrically operating said functional switches responsive to the desired set point outputs.

18. The improved cam program controller system of claim 16 comprising means electrically operating said function switches selectively either at a certain rotational position of said cam or responsive to a certain set point output of said system.

19. An improved cam program controller system for controlling processes by providing set point signals representing time function relationships, said system including a cam having a contour representing a desired program of set point signals, impulse motor means for rotating said cam independently of line frequency, pulse generating means for providing pulses to said impulse motor means, cam follower means juxtaposed to said cam contour for moving responsive to variations in the contour of the cam, means responsive to the movement of said cam follower means as said cam rotates for providing said desired set point signals, and controller means for using said set point signals to control a process.

20. An improved program controller system for controlling processes by providing set point signals representing time function relationships,
said system including a cam having a contour representing a desired program of set point signals,
stepping motor means for rotating said cam independently of line frequency,
pulse generating means for providing pulses to said stepping motor means,
said pulse generating means comprising programmable timer means for providing base frequencies for said pulses,
cam follower means juxtaposed to said cam contour for moving responsive to variations in the contour of the cam,
cam angular position indicating means for indicating the angular position of the cam,
means responsive to the movement of said cam follower means as said cam rotates for providing said desired set point signals,
functional switch means operated responsive to said cam angular position indicating means indicating the rotation of said cam through a desired angle,
means for using said functional switch means to vary the base frequency of the programmable timer whereby the speed of the motor is controllably altered during the program, and
control means for using said set point signals to control a process.

21. An improved cam program controller system for controlling a process by providing set point signals representing time function relationships,
said system including a cam having a contour representing a desired program of set point signals,
means for rotating said cam as a function of time,
cam follower means juxtaposed to said cam contour for moving responsive to variations in the contour of the cam,
means responsive to the movement of said cam follower means as said cam rotates for providing said set point signals,
means for converting said cam follower to a scriber,
meter means for determining the set point signals obtained responsive to the movement of said converted cam follower, whereby said improved cam program controller system can be used to scribe cam blanks and fashion a cam for use in the system, and
controller means for using said set point signals to control a process.

22. An improved cam program controller system for providing set point signals representing time functions,
said system including cam means having contours representing desired programs,
means for rotating said cam means,
cam follower means for following the contour of said cam,
means operated responsive to the movement of said cam follower means for providing signals indicating the radial distance said cam follower means is from the center of said cam,
means for translating said radial distance indicating signals to set point signals,
controller means operated responsive to said set point signals to control a process,
wherein said improvement includes: means for preparing said cam means having contours representing desired programs producing desired set point signals at required angular rotational amounts,
said means for preparing said cam means including meter means for indicating the values of said set point signals,
operate-set up switch means for selectively coupling said set point signals to said controller means or to said meter means,
means for mounting a cam disk in place on said cam rotating means,
said cam disk having lines thereon indicating angular positions,
scribe means on said cam follower means for scribing lines on said cam disk,
means for selectively rotating said cam disk to align said scribe means with a selected one of said lines whereby said cam follower can be moved radially outward from the center of the cam disk along said selected one of said lines until a desired set point is indicated on the meter at which point said scribe means is placed in abutment with said cam disk, and
means for moving said cam disk a discrete distance to scribe said disk at said point whereby said lines are intersected by scribe marks made by said scribe means to indicate the contour of the cam for a desired cam program.

23. The improved cam program controller of claim 22 wherein said means for rotating said cam means comprises impulse motor means, and
pulse generating means for providing pulses to step said impulse motor at selected speeds.

24. The improved cam program controller system of claim 22 wherein said cam follower means includes cam follower shaft means,
roller means surrounding said shaft means,
said roller means designed to abut the contour of said cam means while said cam follower follows said contour, and
said shaft means terminating in said scribe means.

25. The improved cam program controller system of claim 24 wherein said shaft means has an extended position and a distended position,
means for retaining said shaft means in said extended position when said scribe means is used to prepare a cam.

26. The improved cam program controller system of claim 24 wherein said cam follower means comprises a cam follower arm,
said means for providing signals indicating the radial distance said cam follower means is from the center of said cam means comprising function potentiometer means,
coupling means for coupling said cam follower arm to the wiper of said function potentiometer means, whereby when said cam follower moves, said wiper moves varying the signal from said wiper,
said coupling means comprising first negator spring assembly means.

27. The improved cam program controller system of claim 26 wherein said coupling means includes negator spring linkage means,
said linkage means being substantially "V" shaped,
the apex of said "V" being attached to said cam follower means at the point of rotation of said cam follower means, whereby any rotation of said cam follower means rotates said linkage means about said apex, first negator spring pulley attached to the end of one arm of said "V" shaped linkage means, a first negator spring drum fixedly attached to a base plate, said first negator spring running from said first pulley to said first drum, and said function potentiometer attached to said first negator spring drum, whereby when said linkage means moves, said first negator spring moves to move the wiper of said function potentiometer without backlash.

28. The improved cam program controller system of claim 27 including a second negator spring drum fixedly attached to the base plate, a second negator spring pulley attached to the second leg of said "V", a second negator spring running from said second drum to said second pulley, said second negator spring drum and pulley being positioned to cooperate with said first negator spring to maintain a spring bias on said cam follower for retaining said cam follower in abutment with the contour of said cam means with an equal force throughout the movement of said cam means.

29. A cam program controller system for providing a continuous set point signal representing the time function relationship, said system comprising cam means whose contour represents said program, impulse motor means for rotating said cam at a desired frequency, cam follower means abutting said cam contour, signal varying means attached to said cam follower means for varying a signal as a function of the distance of said cam follower from the center of said cam, and negator spring bias assembly means for retaining the cam follower in abutment with said cam contour with a constant force over the complete rotation of said cam.

30. The improved cam program controller system of claim 29 wherein said negator spring bias assembly comprises negator spring linkage means, said linkage means mechanically coupled to said cam follower means to move responsive to movement of said cam follower, means for attaching negator spring bias pulley means to said linkage means, means for fixedly attaching negator spring bias drum means to a base plate below said linkage means in a position to retain said cam follower in abutment with said cam with a constant force over the complete rotation of said cam including portions of said cam wherein the contour slopes negatively.

31. The improved cam program controller system of claim 30 wherein said signal varying means comprises a potentiometer, and anti-backlash means mechanically coupling the wiper of said potentiometer to said cam follower means with a minimum of backlash.

32. The improved cam program controller system of claim 31 wherein said anti-backlash means comprises a function potentiometer negator spring pulley mounted to said linkage means, a function potentiometer negator spring drum fixedly attached to a base plate below said cam means, the hub of said drum coupled to the wiper of said function potentiometer, whereby any movement of said cam follower is coupled to the said potentiometer wiper through said function potentiometer negator spring.

33. An improved cam program controller system for use with function controllers, said cam program system providing set point signals representing time function relationships, said cam program systems including cam means having a contour representing a desired program of said set point signals, impulse motor means for rotating said cam, time pulse generating means for generating pulses for operating said impulse motor, cam follower means juxtaposed to said cam contour for following the contour of said cam means, function potentiometer means operated responsive to the movement of said cam follower means for providing the set point signals, time potentiometer means coupled to said cam means for providing a continuous time signal, and means for controlling said time pulse generating means responsive to said continuous time signal for selectively automatically starting and stopping said cam program system.

34. The improved cam program controller system of claim 33 wherein said impulse motor means is coupled to drive said cam through only a pinion gear and a single anti-backlash drive gear, and means for attaching said time potentiometer to said drive gear.

35. The improved cam program controller system of claim 34 wherein said time pulse generating means comprises programmable timer means, means for varying the base frequency of said programmable timer to thereby vary the speed of said motor, and means for varying the number of pulses generated by said programmable timer to thereby vary the length of the program.

36. The process of preparing a cam program for a cam program controller system having:

a cam follower that is convertible to a scriber, potentiometer means coupled to said scriber for providing a set point signal that varies with the movement of the follower, and meter means for determining the said set point signal, said process comprising the steps of:

mounting a blank cam disk to be rotated by the stepping motor to which the prepared cam will be attached for use in the cam program controller;

converting the cam follower of said program controller to a subscriber;

rotating said cam disk until said scriber is aligned with the start position of the cam disk;

connecting the meter to read the signal responsive to the position of the scriber;

moving said scriber to a point where a desired set point signal is obtained on the meter;

scribing said cam blank at said point;

rotating said cam disk a desired angular rotation;

moving said scriber to obtain a desired set point signal on said meter with said angular rotation;

scribing said cam disk at that point;

continuing the rotation of the cam blank to the desired angular rotation;
moving the scriber to obtain the desired set point signal on the meter at that angular rotation;
scribing the cam disk at that point;

removing the cam disk from the cam program controller system;
connecting the scribe marks; and
cutting the cam disk to obtain a cam having the desired contour.

* * * * *